United States Patent
Locatelli

(10) Patent No.: US 10,691,119 B2
(45) Date of Patent: Jun. 23, 2020

(54) SYSTEM FOR MONITORING PHYSICAL PARAMETERS OF TEXTILE MACHINERY AND METHOD OF PREDICTIVE MAINTENANCE

(71) Applicant: CAMOZZI DIGITAL S.R.L., Brescia (IT)

(72) Inventor: Cristian Locatelli, Brescia (IT)

(73) Assignee: CAMOZZI DIGITAL S.R.L. (IT)

( * ) Notice: Subject to any disclaimer, the term of this patent is extended or adjusted under 35 U.S.C. 154(b) by 205 days.

(21) Appl. No.: 15/327,454

(22) PCT Filed: May 11, 2015

(86) PCT No.: PCT/IB2015/053451
§ 371 (c)(1),
(2) Date: Jan. 19, 2017

(87) PCT Pub. No.: WO2016/016739
PCT Pub. Date: Feb. 4, 2016

(65) Prior Publication Data
US 2017/0146989 A1    May 25, 2017

(30) Foreign Application Priority Data
Jul. 31, 2014    (IT) .............................. BS2014A0138

(51) Int. Cl.
*G05B 23/02*    (2006.01)
*D01H 13/32*    (2006.01)

(52) U.S. Cl.
CPC ......... *G05B 23/0283* (2013.01); *D01H 13/32* (2013.01)

(58) Field of Classification Search
CPC ........................... G05B 23/0283; D01H 13/32
USPC ........................................ 700/139, 142, 143
See application file for complete search history.

(56) References Cited

U.S. PATENT DOCUMENTS

| 4,194,349 A | * | 3/1980 | Lane | ..................... D01H 13/145 57/265 |
| 4,246,748 A | * | 1/1981 | Artzt | ...................... D01H 13/26 57/264 |
| 4,534,042 A | * | 8/1985 | Marsicek | ............... D01H 13/32 242/470 |

(Continued)

FOREIGN PATENT DOCUMENTS

| CH | 705443 | 3/2013 |
| CH | 705443 A2 | 3/2013 |

(Continued)

OTHER PUBLICATIONS

International Search Report for PCT/IB2015/053451 dated Jul. 16, 2015.

(Continued)

*Primary Examiner* — Nathan E Durham
(74) *Attorney, Agent, or Firm* — Thomas | Horstemeyer, LLP

(57) ABSTRACT

A monitoring system of a spinning line (1) comprises detection devices (20) associated to textile machines and main storage means (60), placed in a control room remote with respect to the spinning line (1) and remote processing means (80) operatively connected with the main storage means (60) for processing a huge amount of data (Big Data), to implement a predictive maintenance.

17 Claims, 31 Drawing Sheets

(56) References Cited

U.S. PATENT DOCUMENTS

| | | | |
|---|---|---|---|
| 4,835,699 A | | 5/1989 | Mallard |
| 5,124,928 A | | 6/1992 | Aemmer |
| 5,497,335 A | * | 3/1996 | Hoeller ............... D01H 13/32 139/1 R |
| 5,515,266 A | | 5/1996 | Meyer |
| 5,517,404 A | | 5/1996 | Biber et al. |
| 5,805,452 A | * | 9/1998 | Anthony ............. D01G 11/006 700/142 |
| 6,112,131 A | * | 8/2000 | Ghorashi ............ G01N 33/362 700/142 |
| 6,263,257 B1 | * | 7/2001 | Aemmer ............. G05B 13/027 700/130 |
| 6,317,645 B1 | * | 11/2001 | Jansen .................... D01H 4/36 19/205 |
| 6,381,511 B1 | * | 4/2002 | Hermanns ............. B65H 54/22 57/264 |
| 6,408,221 B1 | * | 6/2002 | Demuth ................... D01G 7/00 700/130 |
| 6,532,396 B2 | * | 3/2003 | Gaukler ................... D01H 4/44 112/275 |
| 6,650,959 B1 | * | 11/2003 | Bouvyn ................ G01N 27/60 324/454 |
| 6,745,097 B2 | * | 6/2004 | Kusuzono ............. B65H 49/12 57/332 |
| 2004/0024484 A1 | * | 2/2004 | Bahlmann ............... D01H 4/42 700/130 |
| 2004/0133297 A1 | * | 7/2004 | Vergote ................. D03D 51/18 700/140 |
| 2007/0088550 A1 | | 4/2007 | Filev et al. |
| 2012/0029839 A1 | | 2/2012 | Ritter et al. |
| 2014/0101058 A1 | | 4/2014 | Castel et al. |
| 2014/0107829 A1 | * | 4/2014 | Maleck ............... D01H 13/145 700/139 |

FOREIGN PATENT DOCUMENTS

| | | |
|---|---|---|
| CN | 1092829 A | 9/1994 |
| CN | 1721600 A | 1/2006 |
| CN | 1327057 | 7/2007 |
| CN | 101545162 A | 9/2009 |
| CN | 101117738 | 6/2012 |
| CN | 102517716 A | 6/2012 |
| CN | 1952228 | 8/2012 |
| CN | 102868336 | 1/2013 |
| CN | 203164132 U | 8/2013 |
| CN | 103484987 | 1/2014 |
| DE | 4112226 | 11/1992 |
| DE | 4334472 | 4/1994 |
| DE | 19539354 A1 | 5/1996 |
| DE | 19907684 A1 | 8/2000 |
| DE | 10142976 | 3/2003 |
| DE | 10235525 | 4/2003 |
| DE | 10212712 A1 | 10/2003 |
| DE | 102004052669 A1 | 6/2005 |
| DE | 102005020579 A1 | 11/2006 |
| DE | 102005044733 A1 | 3/2007 |
| DE | 102006048430 | 5/2007 |
| DE | 102007032237 A1 | 1/2009 |
| DE | 112005000594 | 8/2009 |
| EP | 0541483 | 5/1993 |
| JP | H02163266 | 6/1990 |
| JP | 5077835 | 11/2012 |
| JP | 5769039 | 8/2015 |
| JP | 6207332 | 10/2017 |
| JP | 6506507 | 4/2019 |
| WO | 2002061514 | 8/2002 |
| WO | 2005101150 | 10/2005 |
| WO | 2007012212 A1 | 2/2007 |
| WO | 2009107805 | 9/2009 |

OTHER PUBLICATIONS

Italian Search Report for IT BS20140138 dated Nov. 7, 2014.
Chinese Office Action for Chinese Patent Application No. 2015800412447 dated Jun. 5, 2018, 9 pages.
The Indian Textile Journal: "Total productive maintenance in spinning industry" (Jul. 2012).
Tmilinovic's Blog on WorldPress.com: "Predictive Maintenance by using R Statistical Language for Predictive Analytics" (Aug. 26, 2013).
Electric Light & Power: "Big Data Creates Predictive Maintenance Opportunities" (Apr. 15, 2014).
TextileToday: "Optimization of productivity and maintenance in textile industries" (Feb. 16, 2012).

* cited by examiner

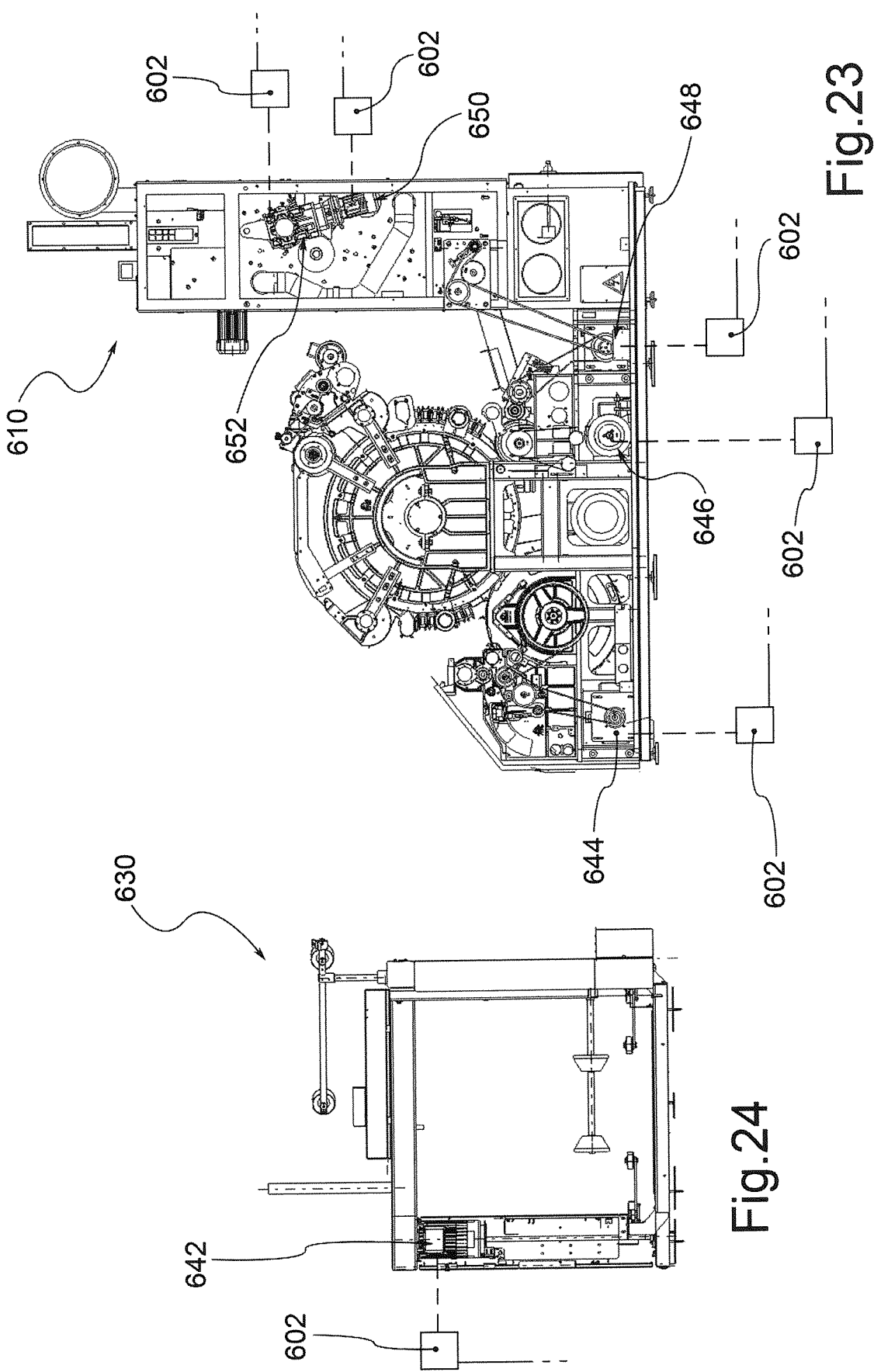

SYSTEM FOR MONITORING PHYSICAL PARAMETERS OF TEXTILE MACHINERY AND METHOD OF PREDICTIVE MAINTENANCE

CROSS-REFERENCE TO RELATED APPLICATION

This application is the 35 U.S.C. § 371 national stage application of PCT Application No. PCT/IB2015/053451, filed May 11, 2015, where the PCT claims priority to and the benefit of, IT Patent Application No. BS2014A000138, filed Jul. 31, 2014, both of which are herein incorporated by reference in their entireties.

This invention relates to a system for monitoring physical parameters of textile machinery in a spinning line for the transformation of fibres into yarn.

In particular, this invention relates to a monitoring system for textile machinery, for example blow room machines (such as a plucker, mixer, opener, mixing loader, scale loader of tuft blender), carding machines, combing machines (for example a drawing frame, lap winder or comber) and spinning machines (such as a roving frame or a spinning machine).

As is known, for a spinning line to be economically profitable, it must work continuously, without interruptions due to breakdown or processing stoppages.

However, the repair work necessary to restore the operation of a machine frequently leads to production downtime for a longer of shorter period, depending on the extent of the fault. It is therefore extremely important to intervene on the machines in time to perform service that is scheduled or guided by the monitoring system before a breakdown or fault occurs. This approach to maintenance management is known by the term "predictive maintenance".

However, effectively implementing a predictive maintenance system is extremely complex, since predictions of breakdowns or faults, based on which the service is to be performed, can be deemed reliable only if based on experience from a high number of cases, i.e., from a high number of machines, a high number of hours of work and a large historical archive of applications and operating conditions, well beyond the machines present in a single spinning mill.

The purpose of this invention is to provide a system for monitoring the operation of textile machines in a spinning line for the implementation of a reliable predictive maintenance system.

This purpose is achieved by a system realized according to claim 1.

The characteristics and advantages of the monitoring system realized according to this invention will be apparent from the following description, given by way of non-limiting example, in accordance with the accompanying figures, wherein.

Figure 15:
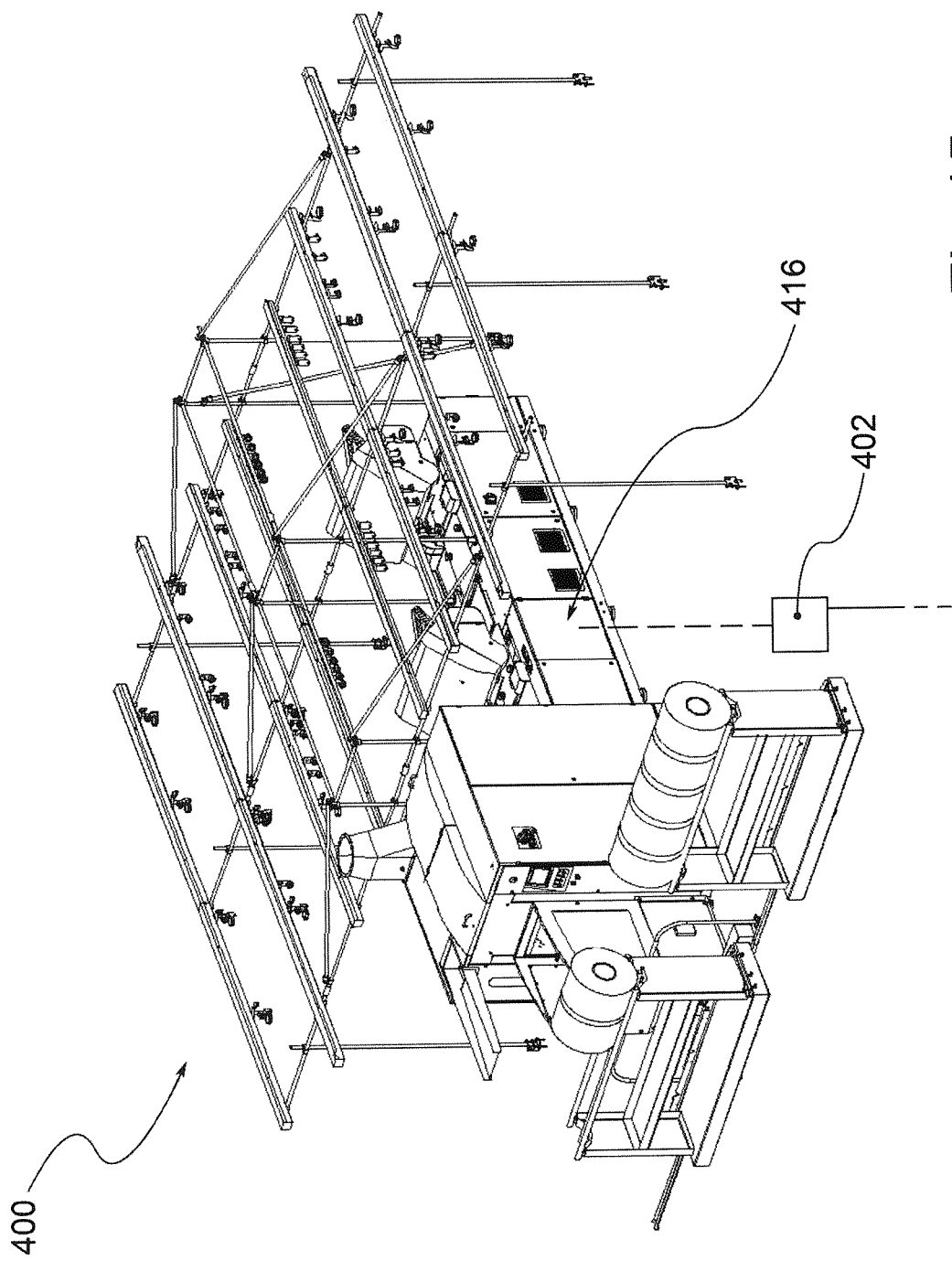
Figure 16:
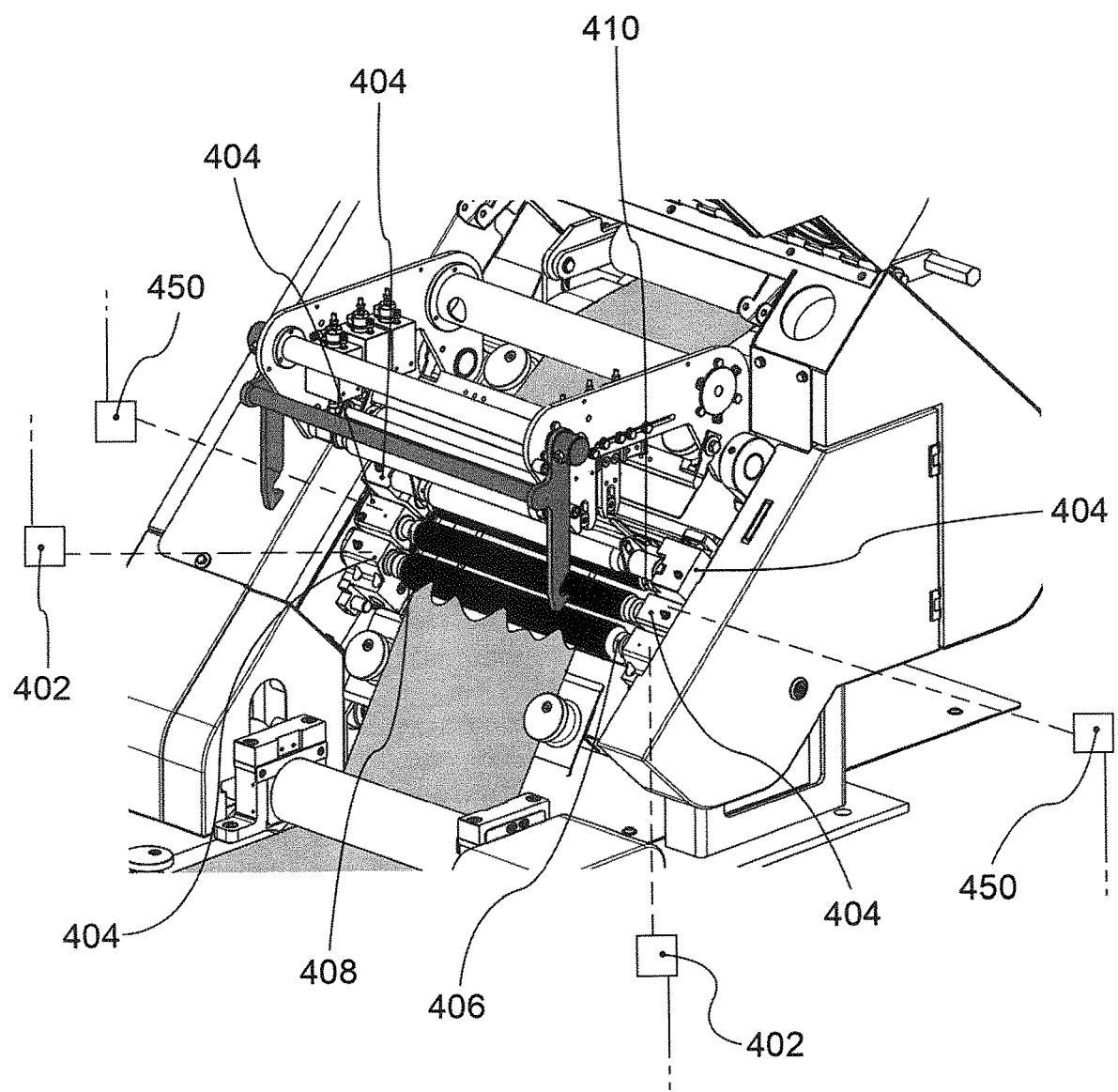
Figure 17:
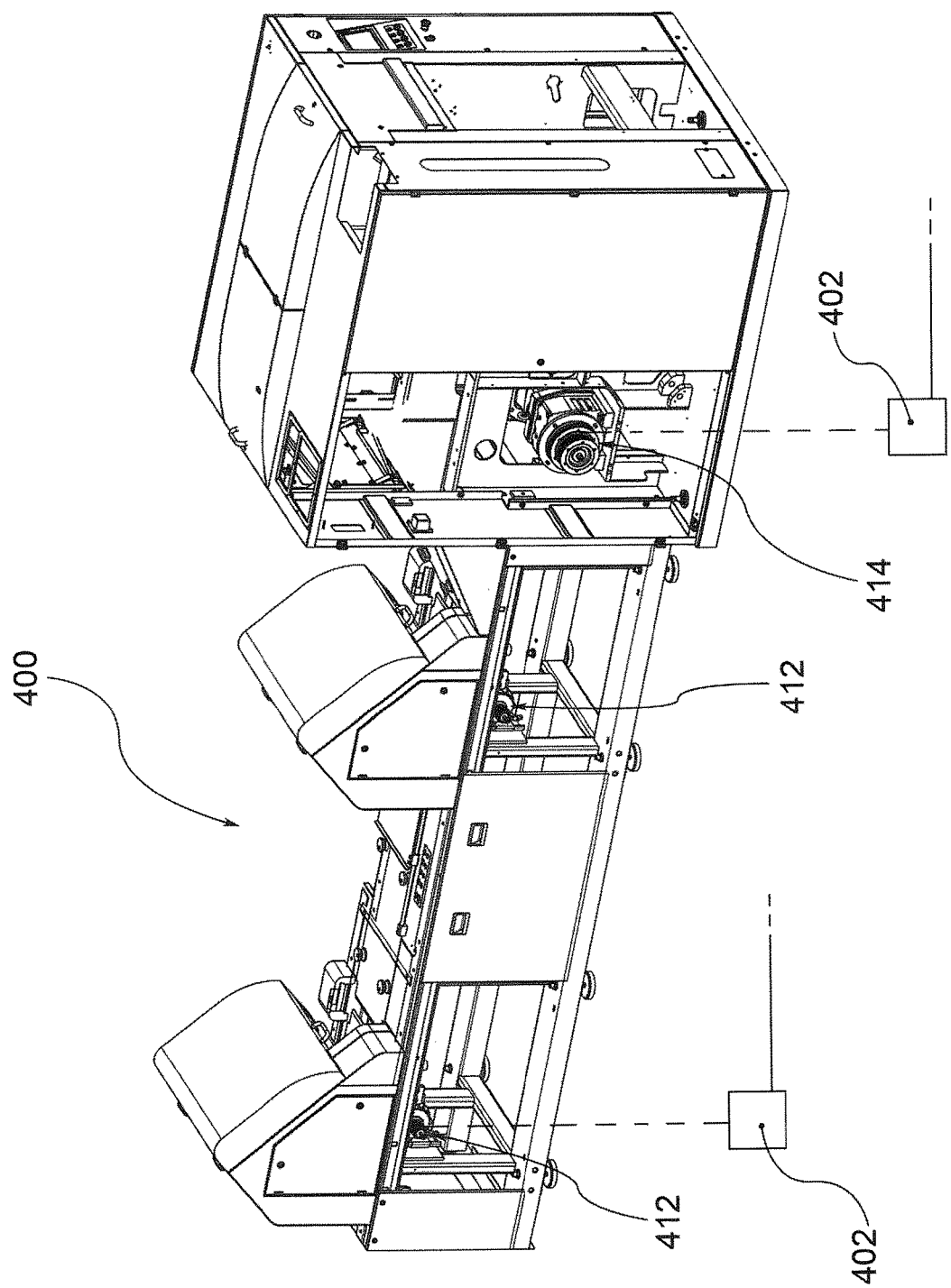
Figure 18:
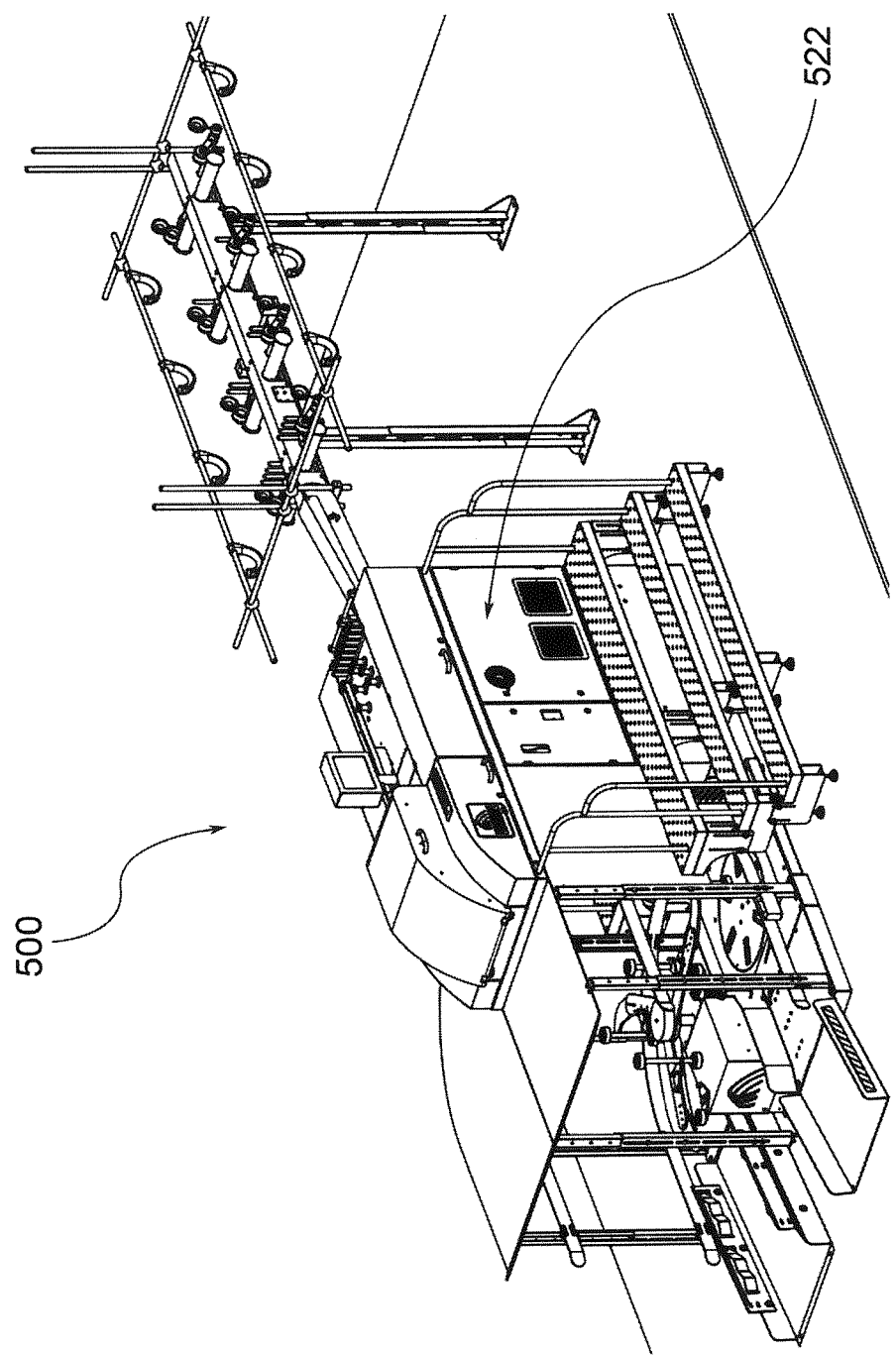
Figure 19:
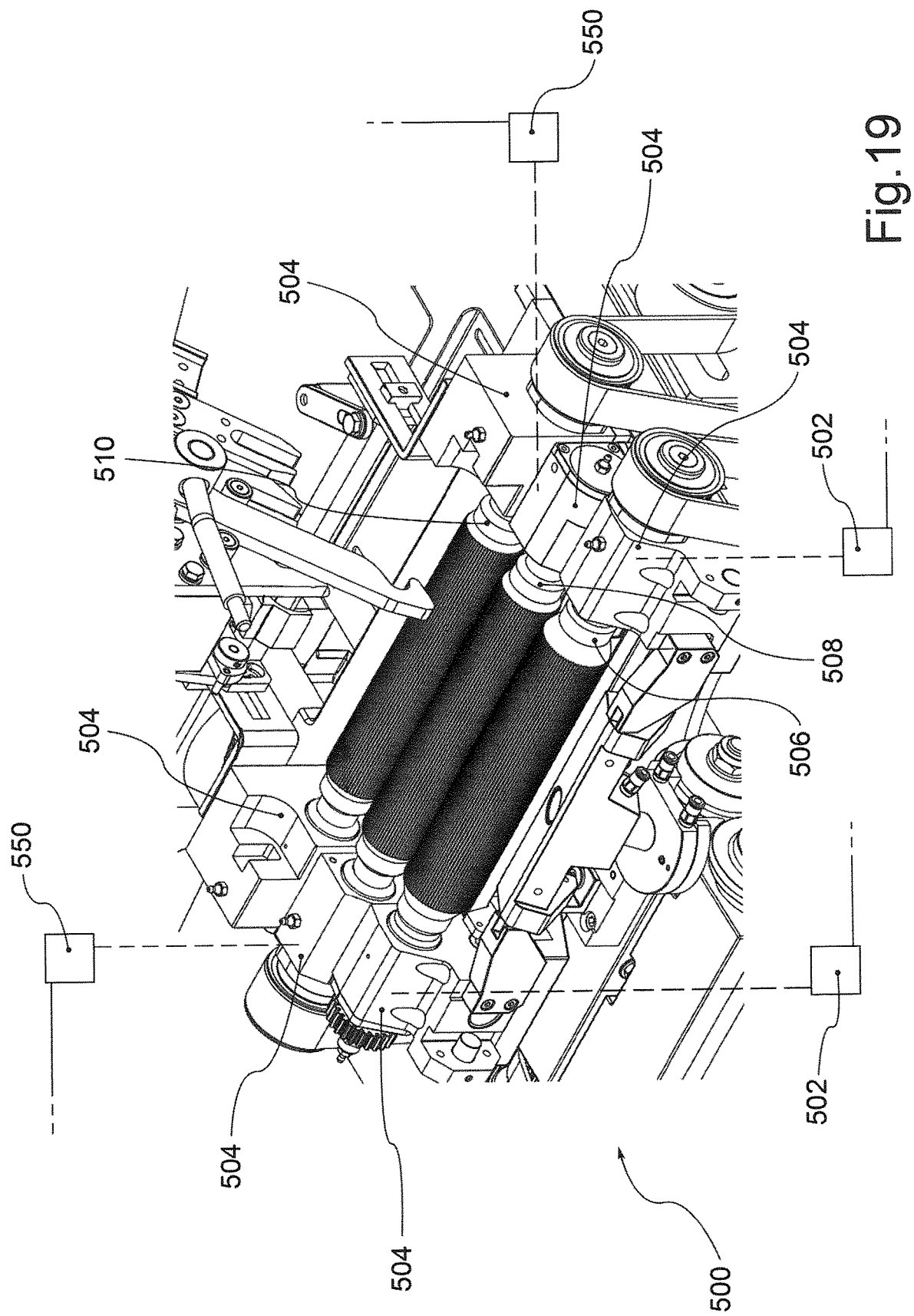
Figure 20:
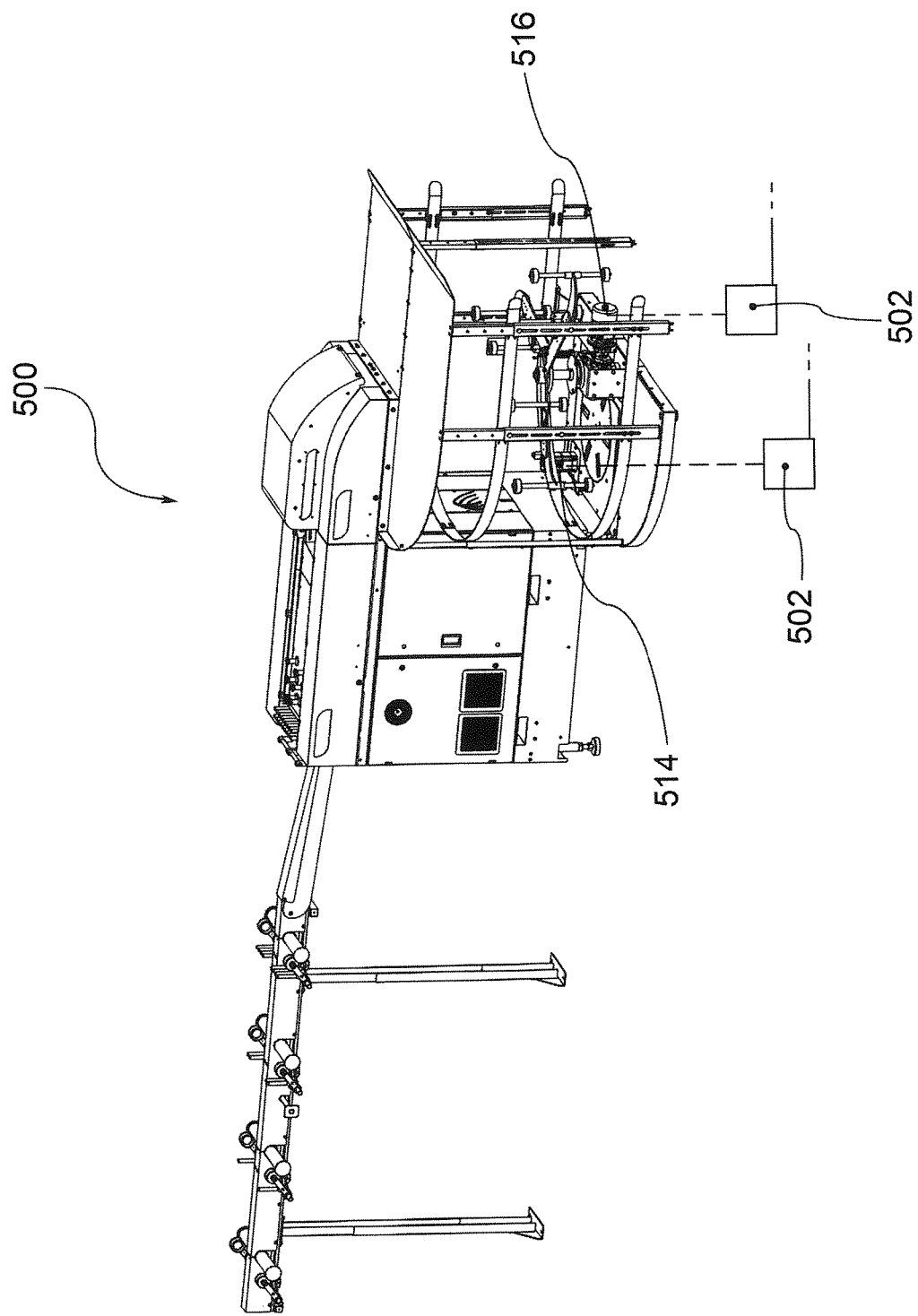
Figure 21:
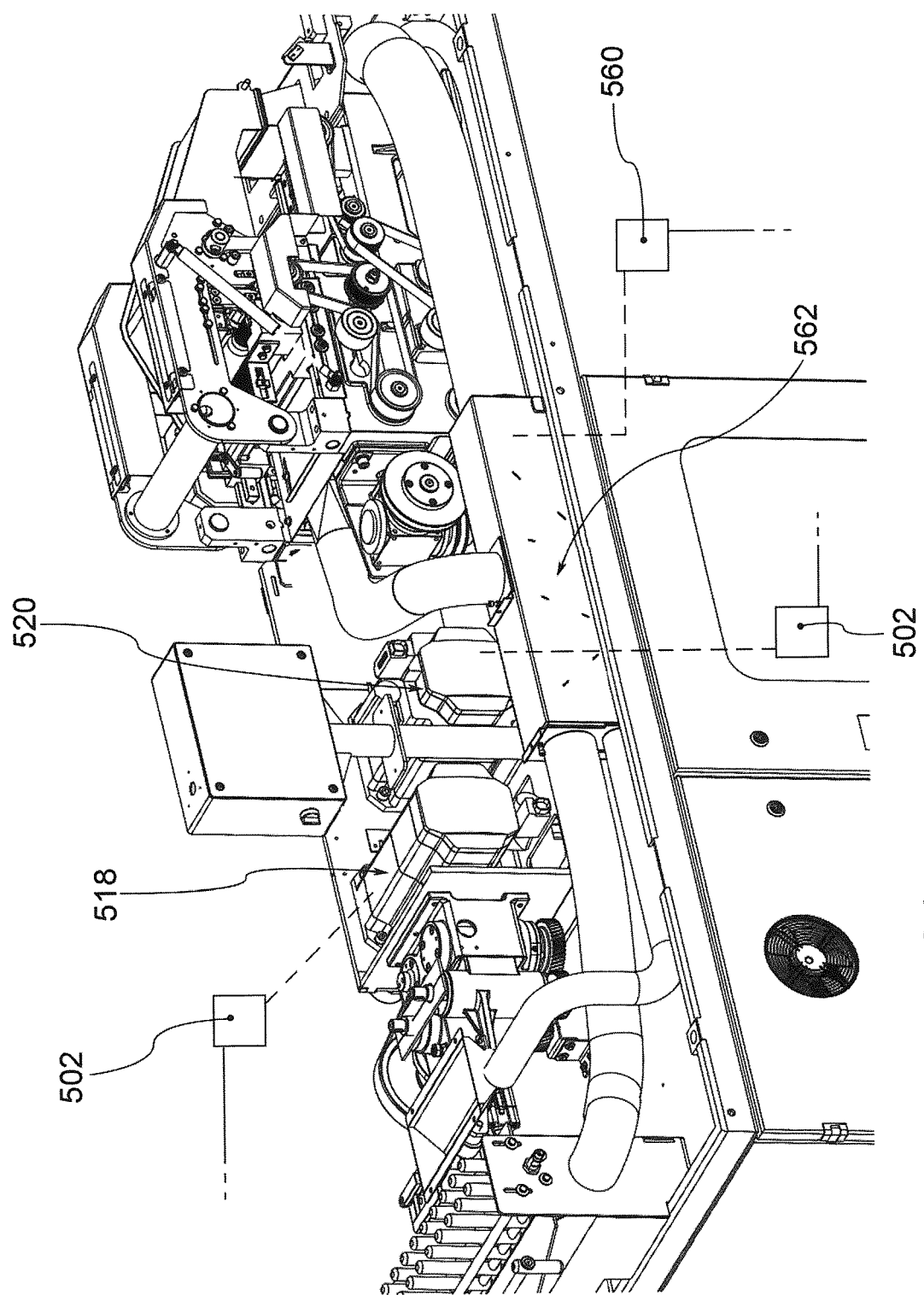
Figure 22:
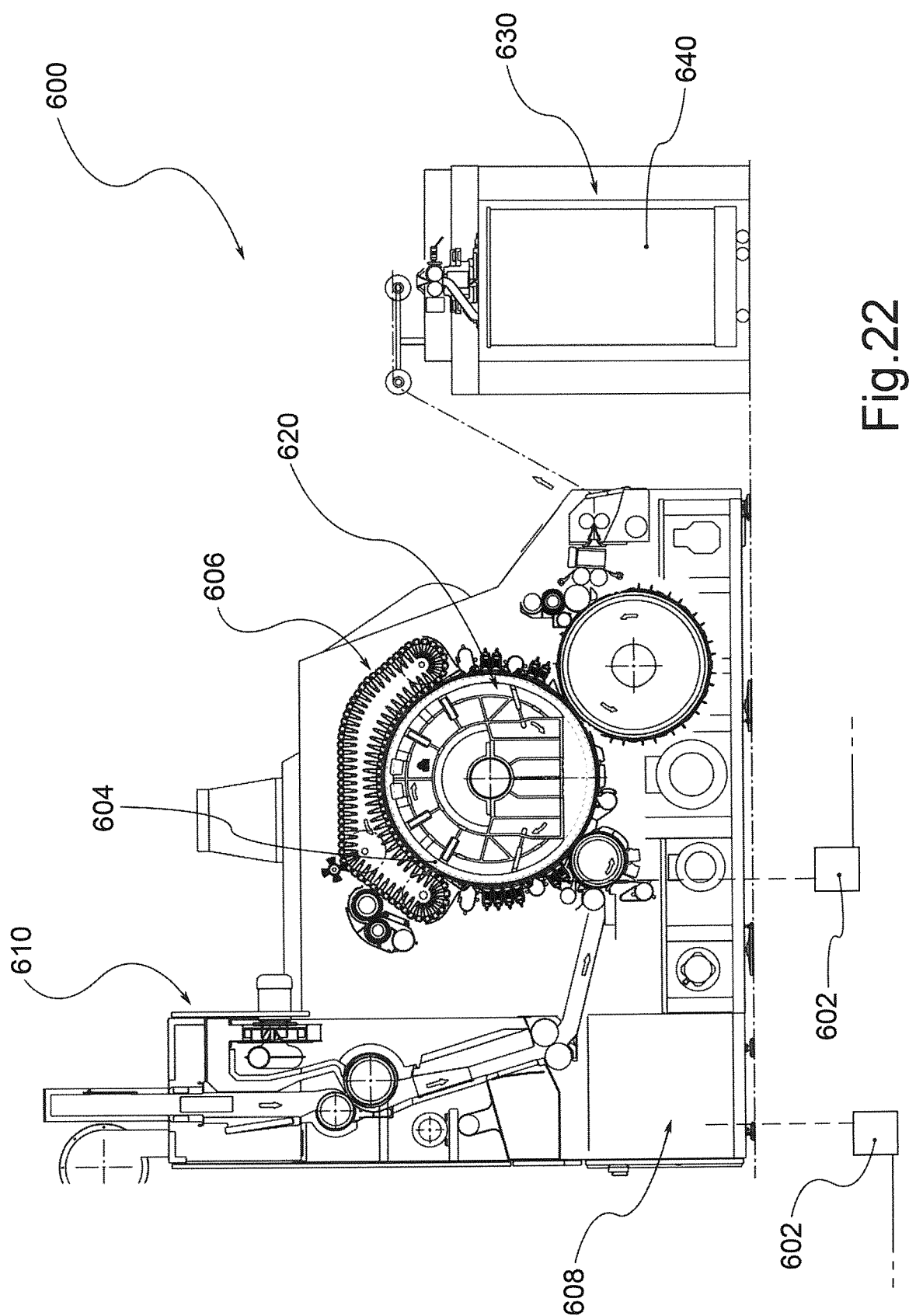
Figure 25:
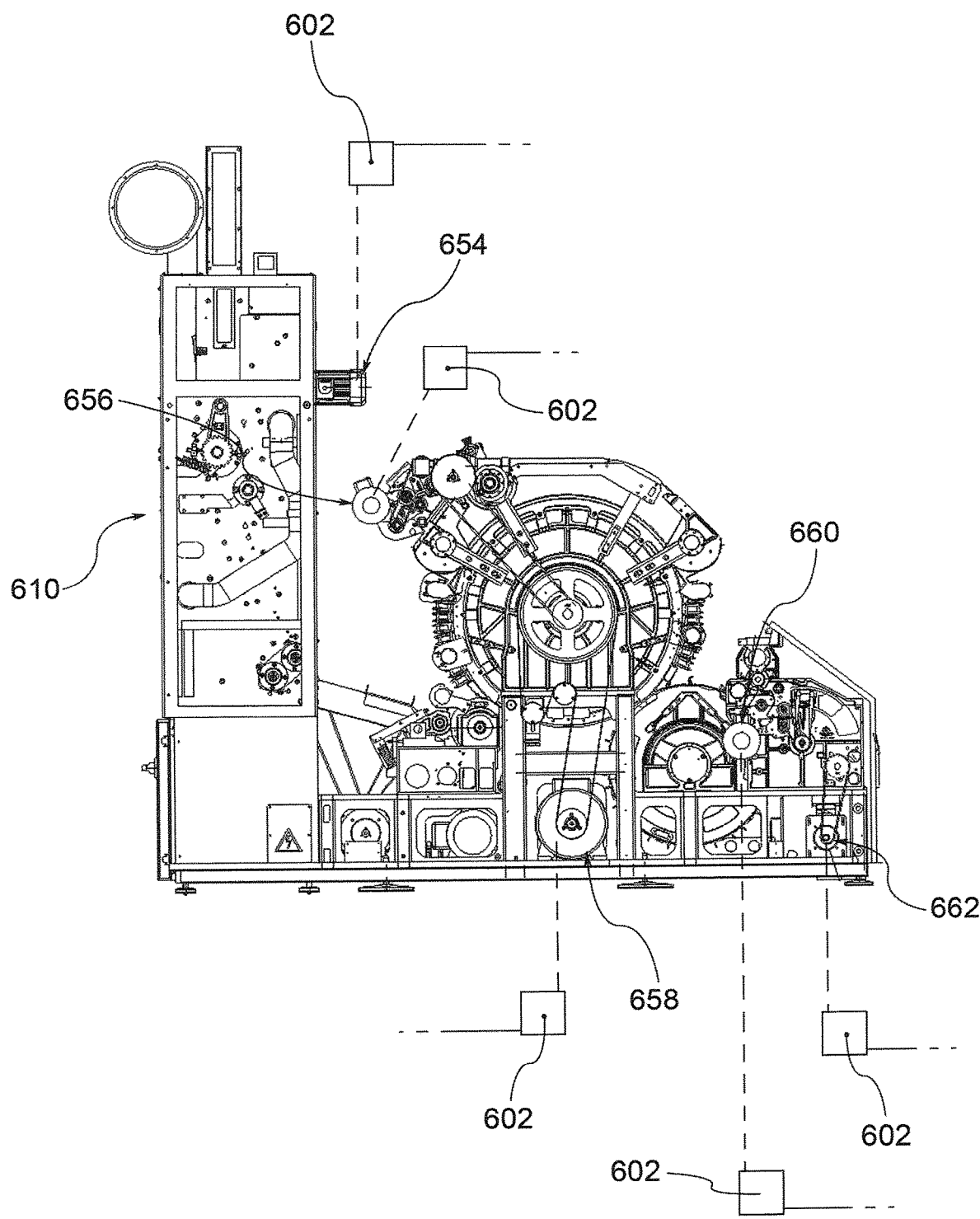
Figure 26:
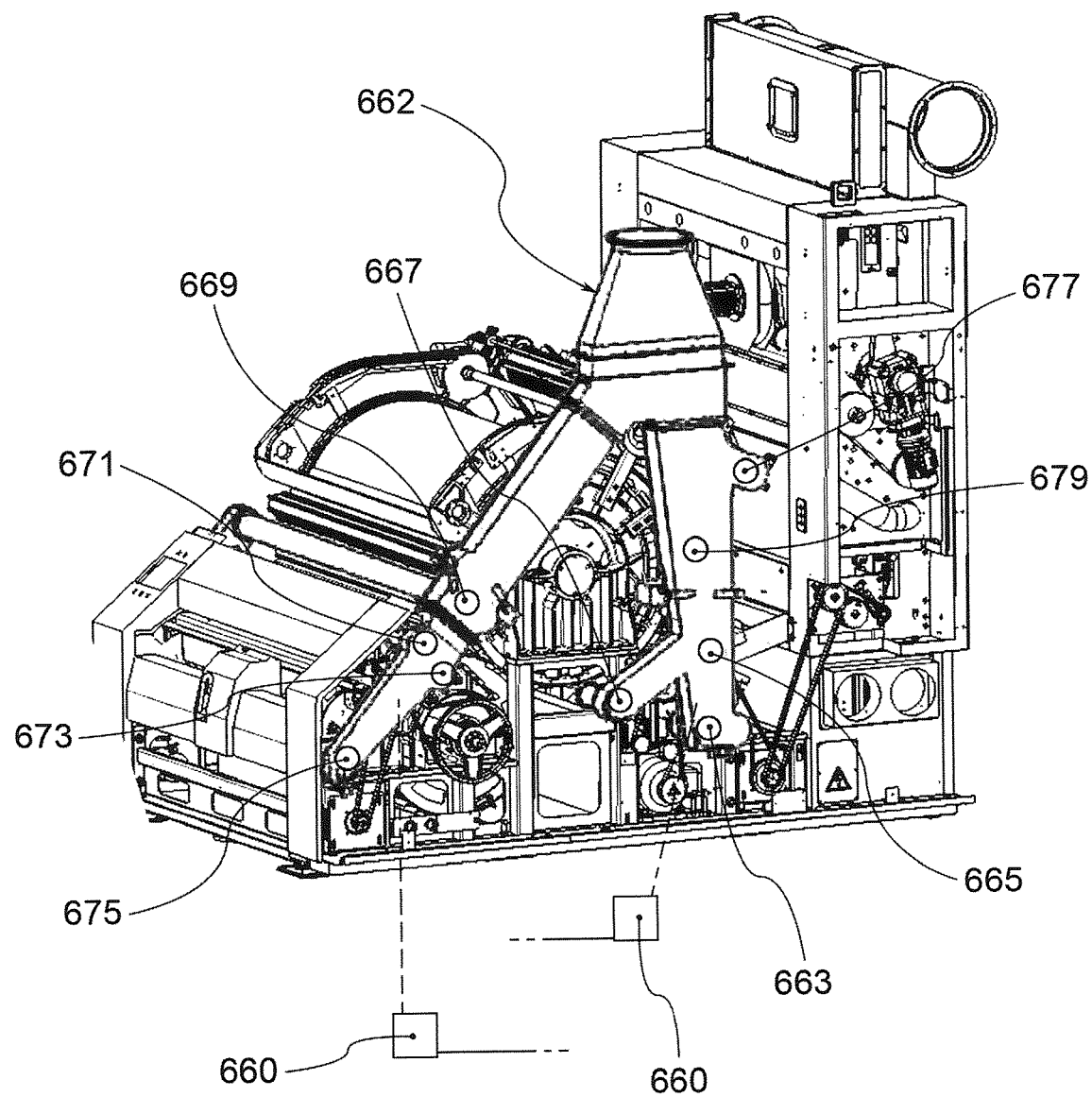
Figure 27:
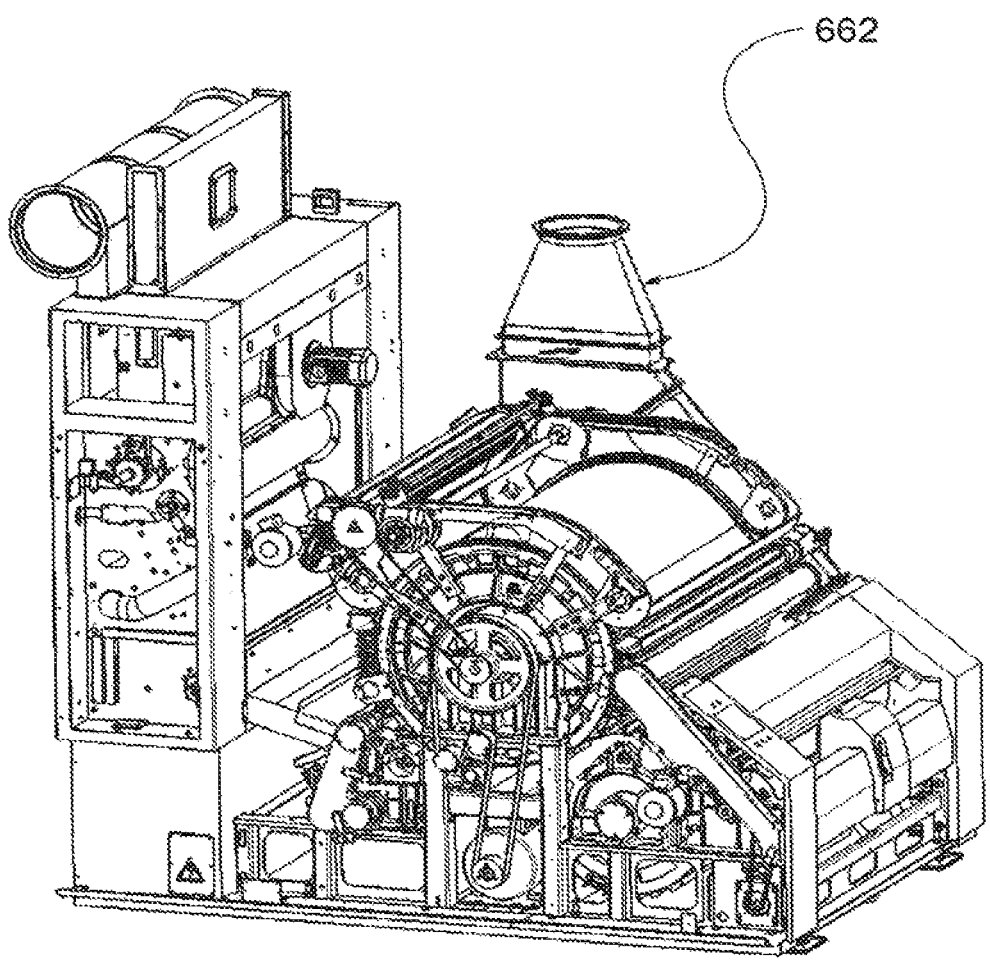
Figure 28:
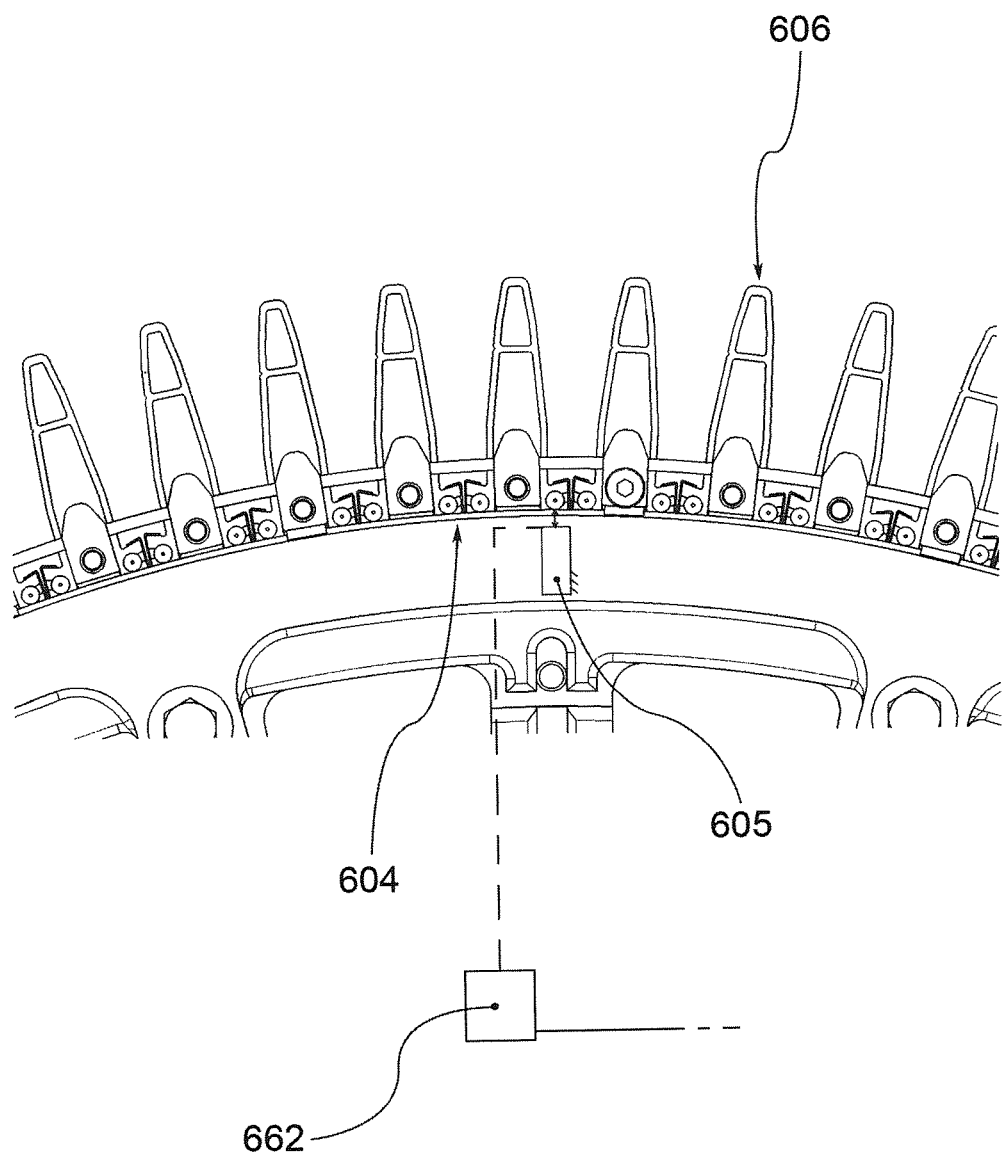
Figure 29:
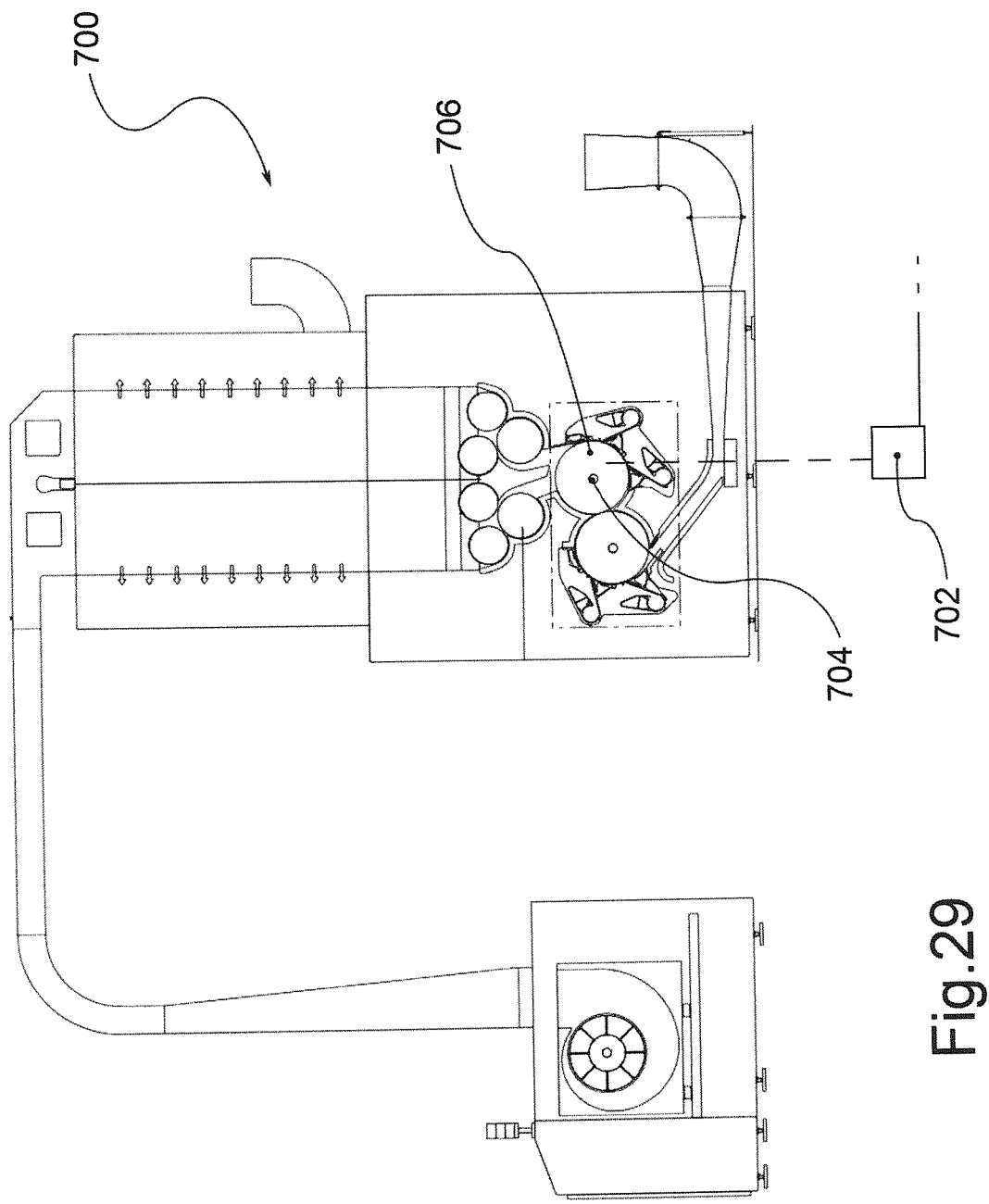
Figure 30:
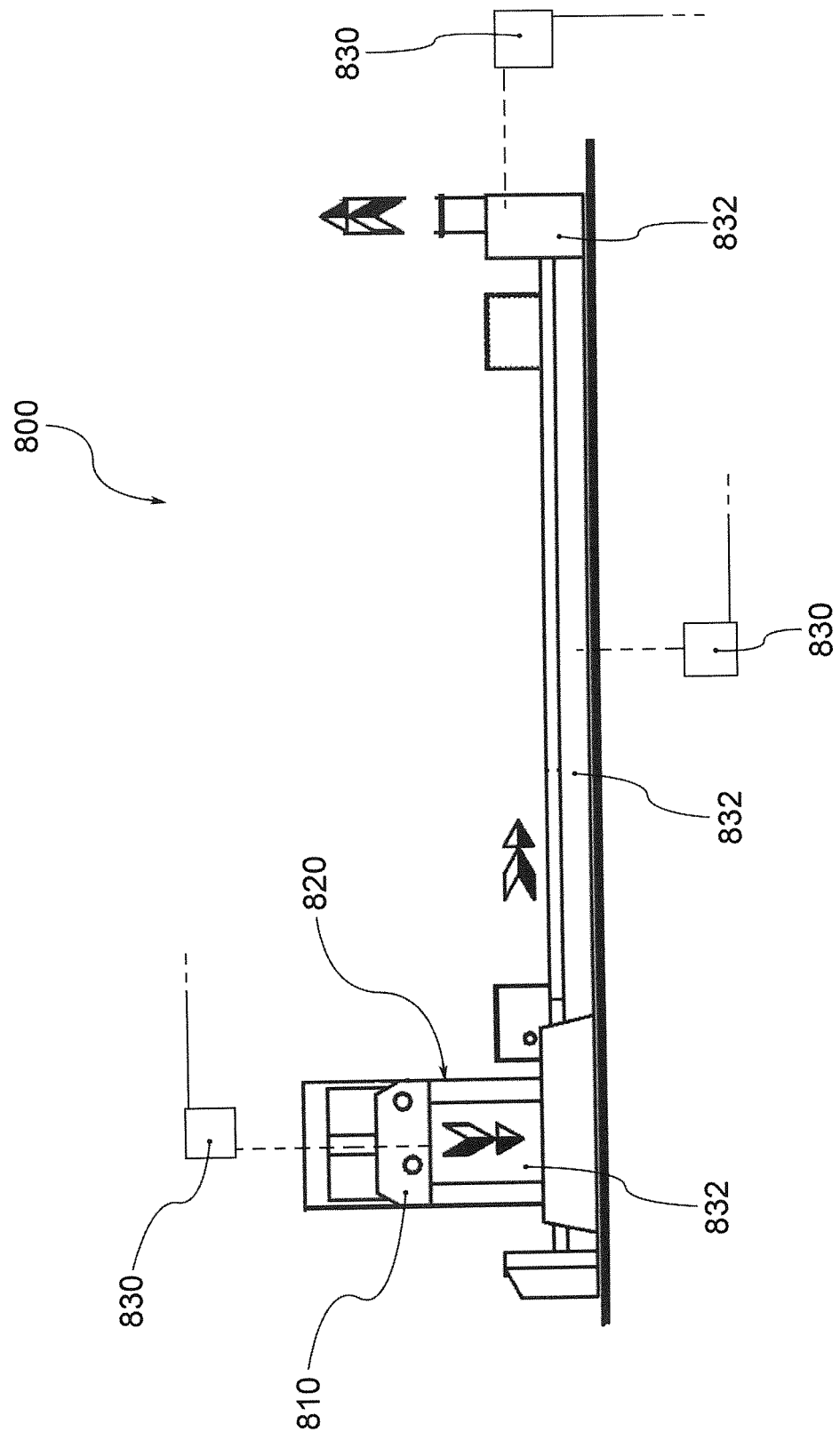
Figure 31:
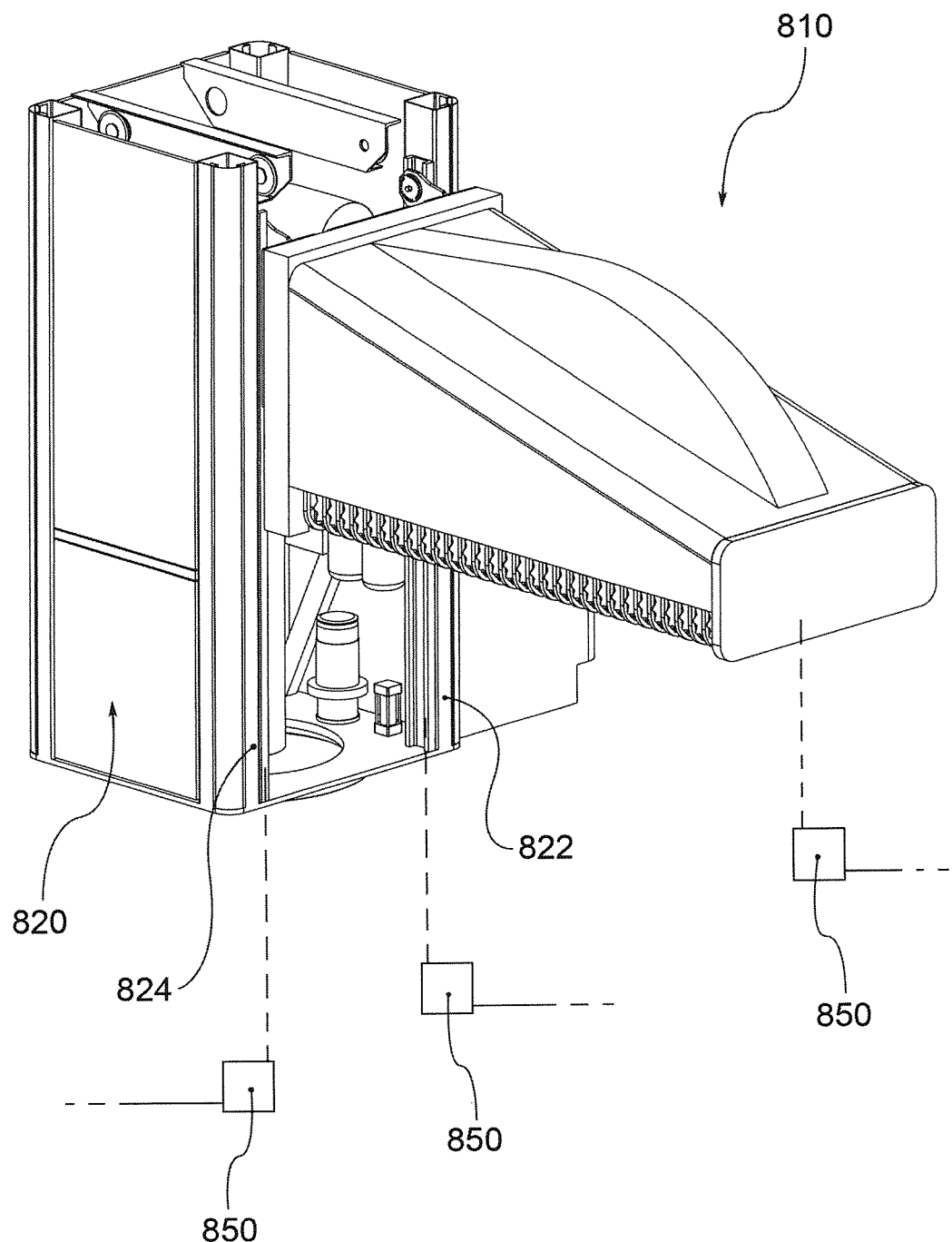
Figure 32:
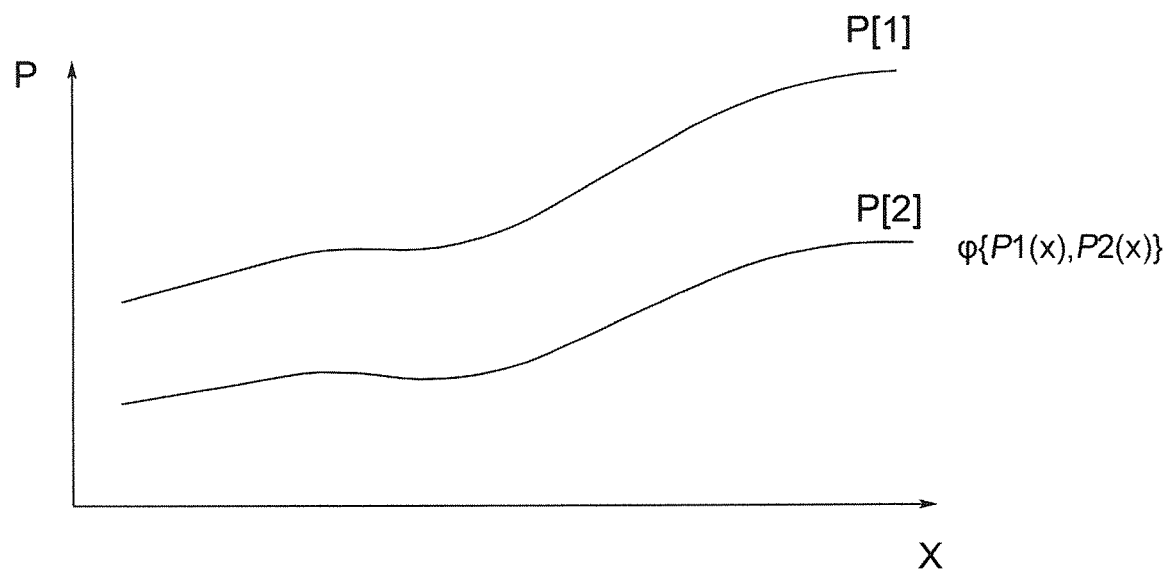
Figure 33:
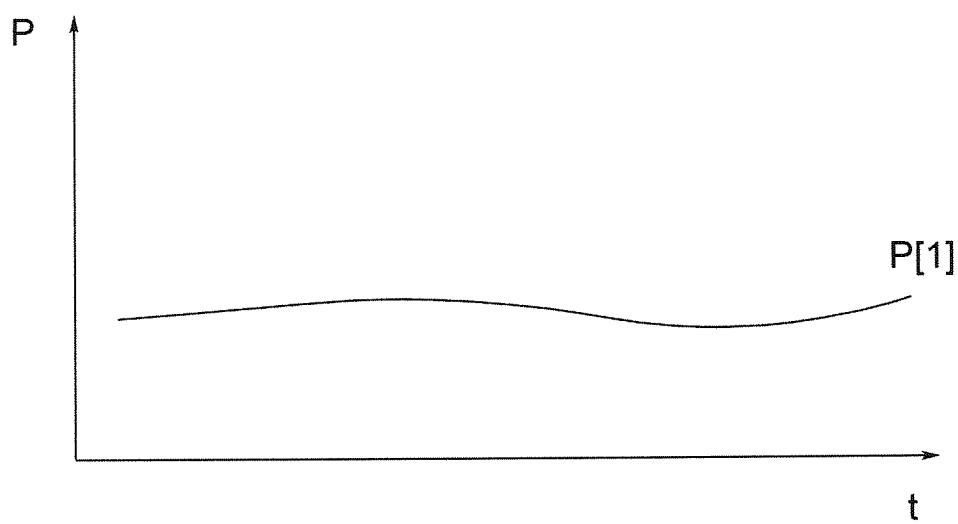

FIGS. 3 to 6 refer to a spinning machine equipped with sensors for the monitoring system, in accordance with an embodiment of this invention;

FIGS. 7 to 10 refer to a roving frame equipped with sensors for the monitoring system, in accordance with an embodiment of this invention;

FIGS. 11 to 14 refer to a comber equipped with sensors for the monitoring system, in accordance with an embodiment of this invention;

FIGS. 15 to 17 refer to a lap winder equipped with sensors for the monitoring system, in accordance with an embodiment of this invention;

FIGS. 18 to 21 refer to a drawing frame equipped with sensors for the monitoring system, in accordance with an embodiment of this invention;

FIGS. 22 to 28 refer to a carding machine equipped with sensors for the monitoring system, in accordance with an embodiment of this invention;

FIG. 29 refers to an opener equipped with sensors for the monitoring system, in accordance with an embodiment of this invention; and FIGS. 30 and 31 refer to a plucker equipped with sensors for the monitoring system, accordance with an embodiment of this invention;

FIGS. 32 and 33 respectively represent the trend of generic parameters P1 and P2 as a function of a further generic parameter X and the trend of a generic parameter P1 as a function of time t.

Figure 1:
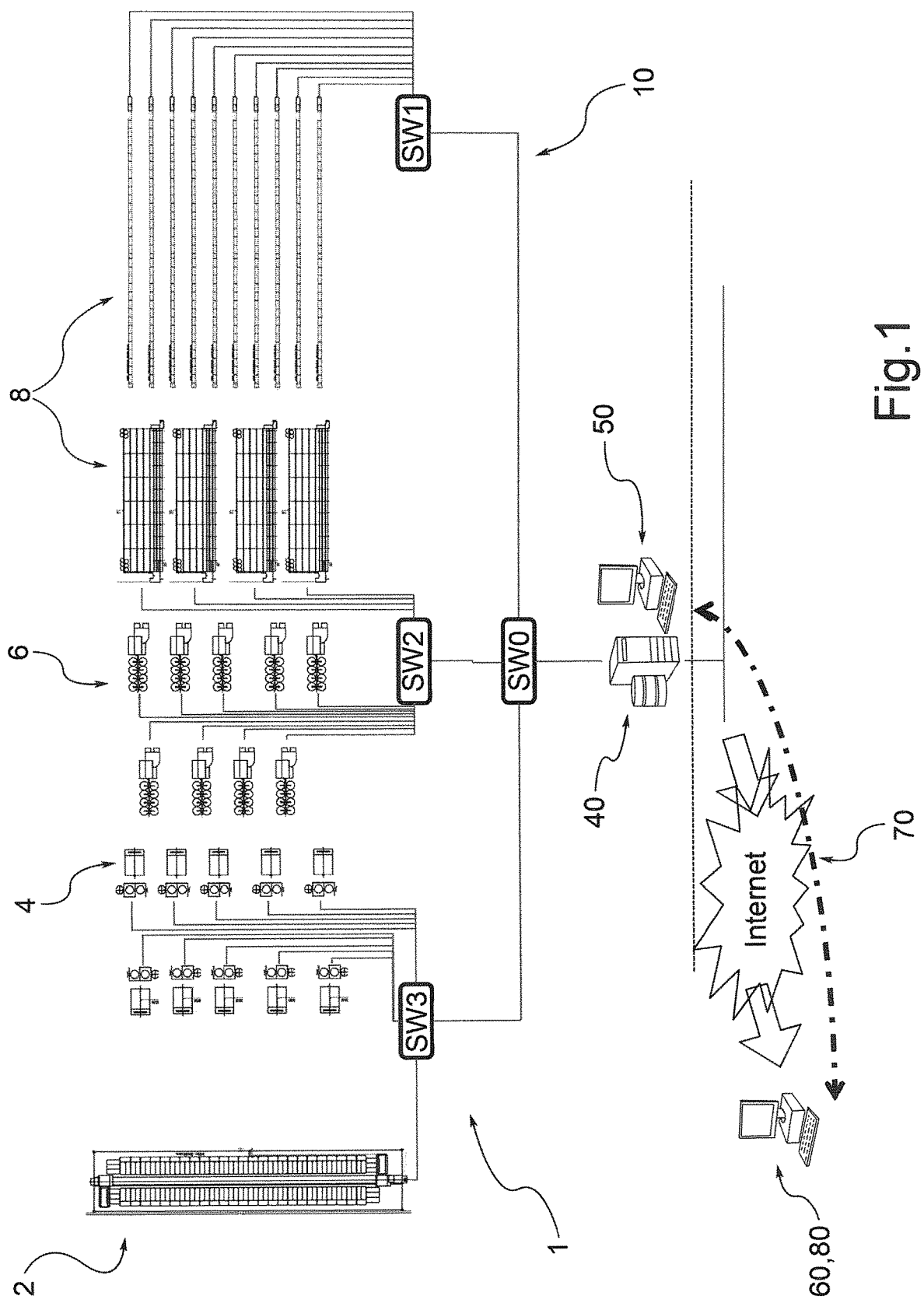
FIG. 1 is a diagram of a spinning line and a monitoring system according to this invention, in accordance with an embodiment.

According to an embodiment of the invention, with reference to FIG. 1, a spinning line 1 is installed at a spinning mill. The term "spinning mill" refers to the industrial plant in which textile processes are carried out that consist in the sequence of operations necessary for the transformation of textile fibres into yarn or thread.

Preferably, a plurality of spinning lines 1 are installed in a spinning mill.

The spinning line 1 comprises for example one or more blow room machines 2 (such as a plucker, mixer, opener, mixing loader, scale loader or tuft blender), one or more carding machines 4, one or more combing machines 6 (for example a drawing frame, lap winder or comber), one or more spinning machines 8 (such as a roving frame or a spinning machine), installed at the spinning mill, and a local apparatus 10 of a monitoring system, for the detection and/or collection of characteristic data of said machines 2, 4, 6, 8.

The local apparatus 10 comprises at least one detection device 20 engaged with the respective machine 2, 4, 6, 8 for the detection of a physical quantity of the machine, such as an operating parameter.

According to an embodiment, said detection device is suitable to provide a temperature value; for example, said detection device is a temperature sensor, for example a resistance thermometer or a thermal probe, suitable to detect the temperature of support structures of moving organs of the machine, during normal processing.

According to a further embodiment, said detection device is suitable to provide a pressure value; for example, said detection device is a pressure sensor, for example a pressure transducer, suitable for detecting the magnitude of a depression in the suction ducts of the machine.

According to a yet further embodiment, said detection device is suitable to provide an acceleration value; for example, said detection device is an acceleration sensor, for example an accelerometer, suitable for detecting the magnitude of the vibrations to which said component is subject.

Additionally, according to an embodiment, said detection device is suitable to provide a distance value; for example, said detection device is a distance sensor, for example an inductive sensor, suitable for detecting the distance between two organs of the machine, for example an organ in motion and a fixed abutment, to monitor the maintenance of predetermined distances between said organs.

According to a further embodiment, said detection device is suitable to provide a current value; for example, said detection device is a current sensor, suitable for detecting the current absorbed by the electric motors of the machine.

According to a yet further embodiment, said detection device is suitable to provide a force value; for example, said detection device is a force sensor, for example a load cell, suitable for detecting the tensioning of belts of the machine.

In addition, each machine 2, 4, 6, 8 is provided with a control unit for the management of the processing, which itself detects (and possibly stores) status data of the respective machine, such as speed of one or more organs, power absorbed, current absorbed by the motors, the temperature of certain organs, etc.

Preferably, moreover, the local apparatus comprises image acquisition means, for example at least one webcam for the capture of images relating to machines or their organs.

Figure 2:
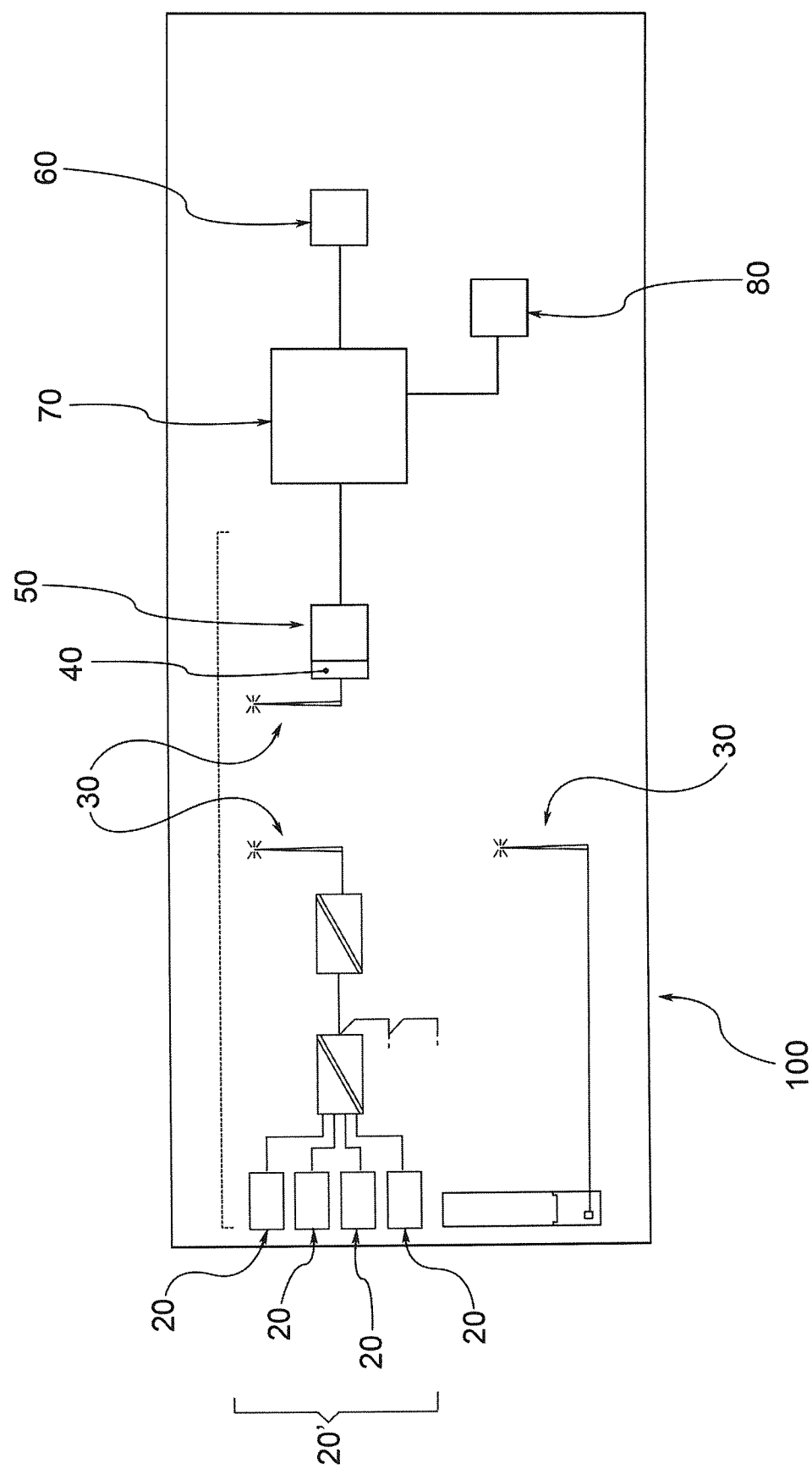
FIG. 2 is a further diagram of the monitoring system according to this invention, in accordance with an embodiment.
Figure 3:
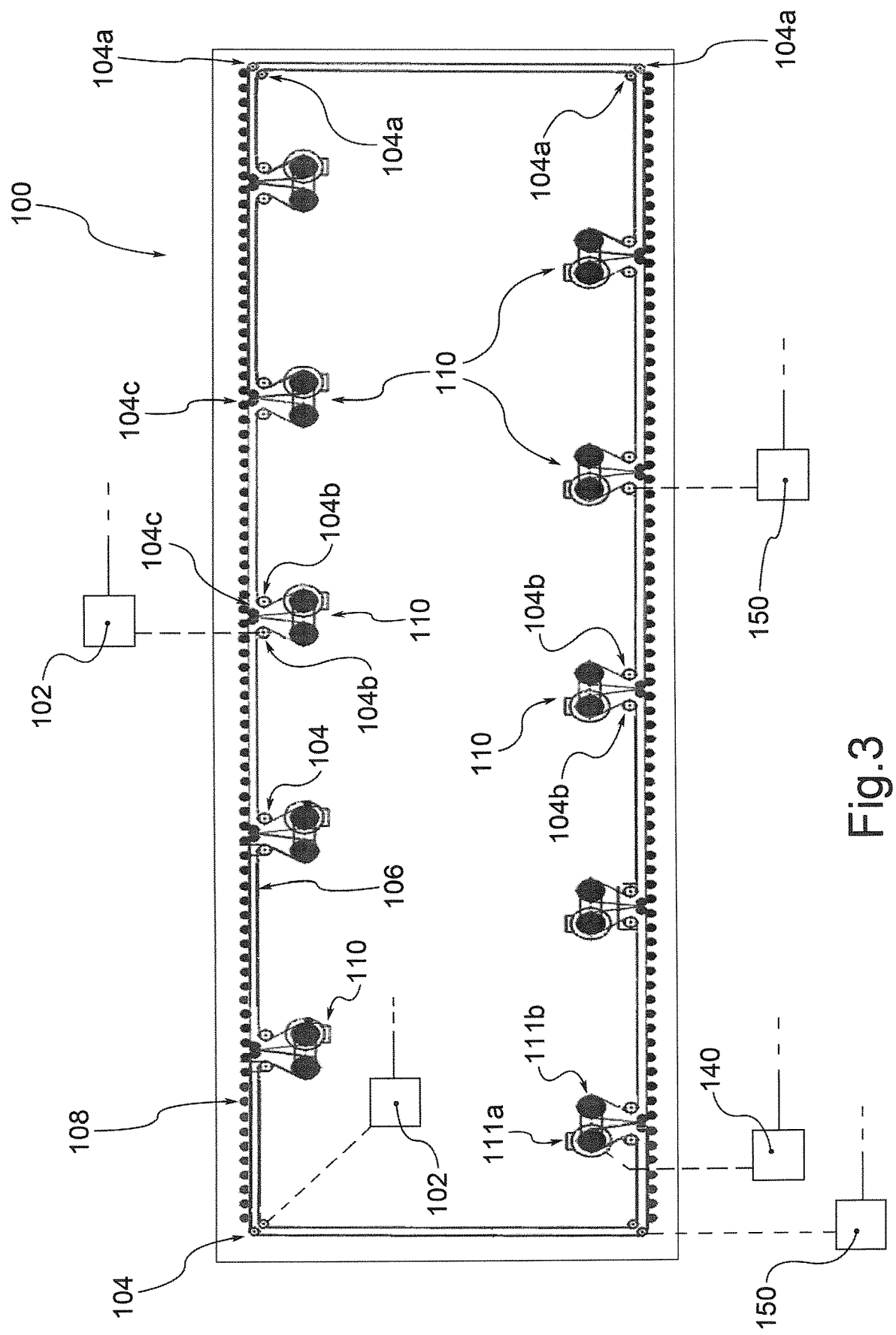
Figure 4:
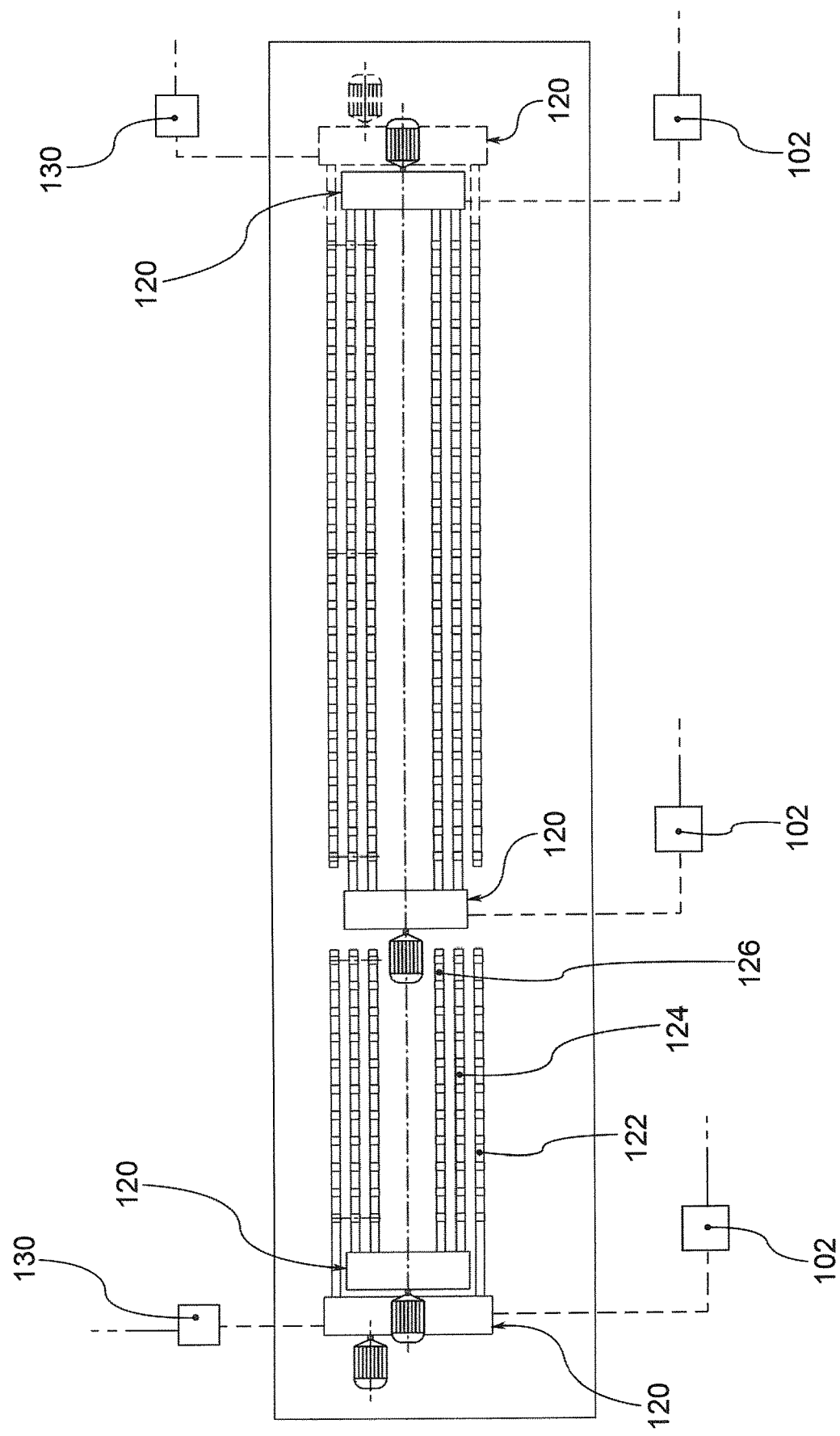
Figure 5:
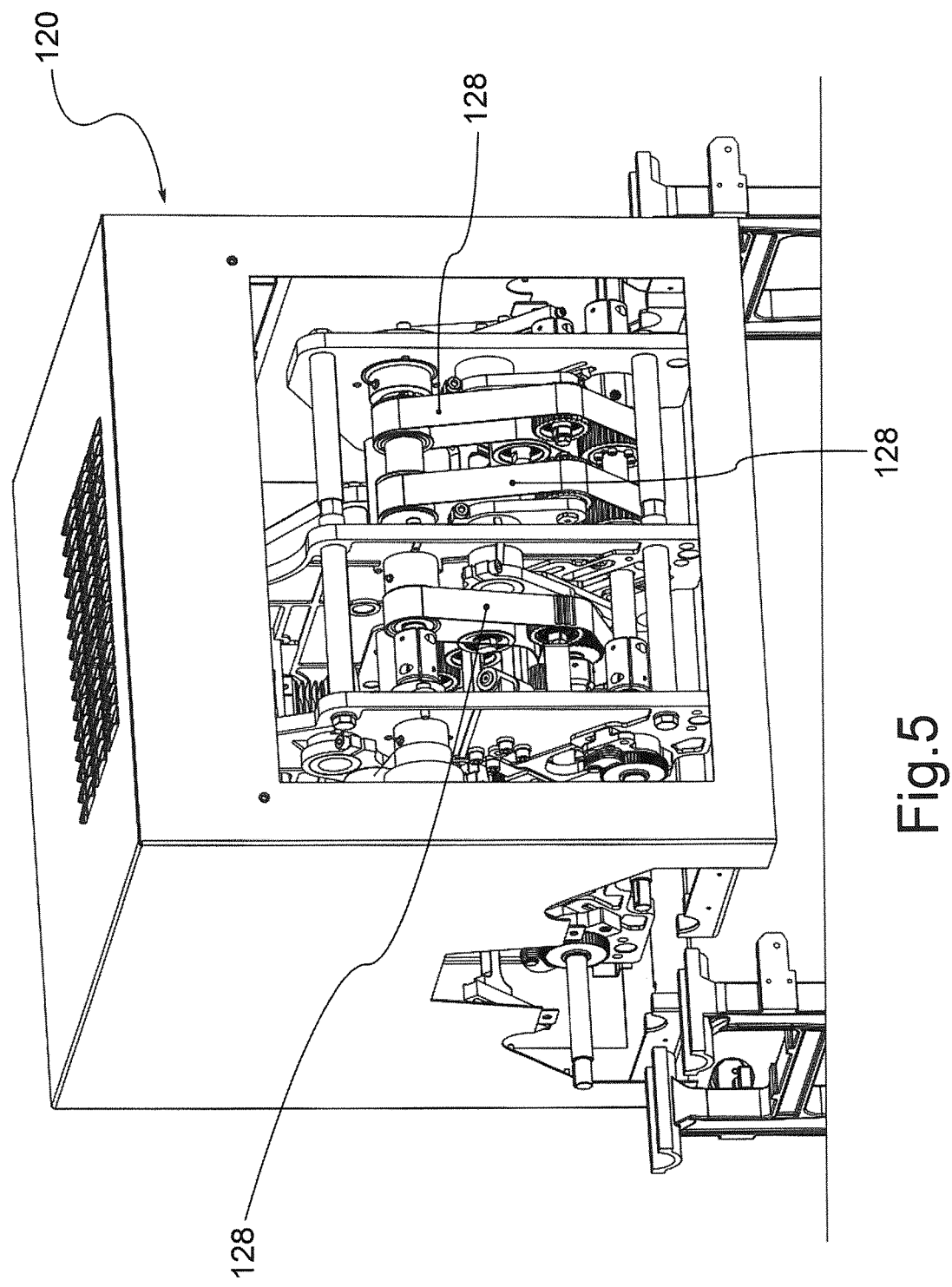
Figure 6:
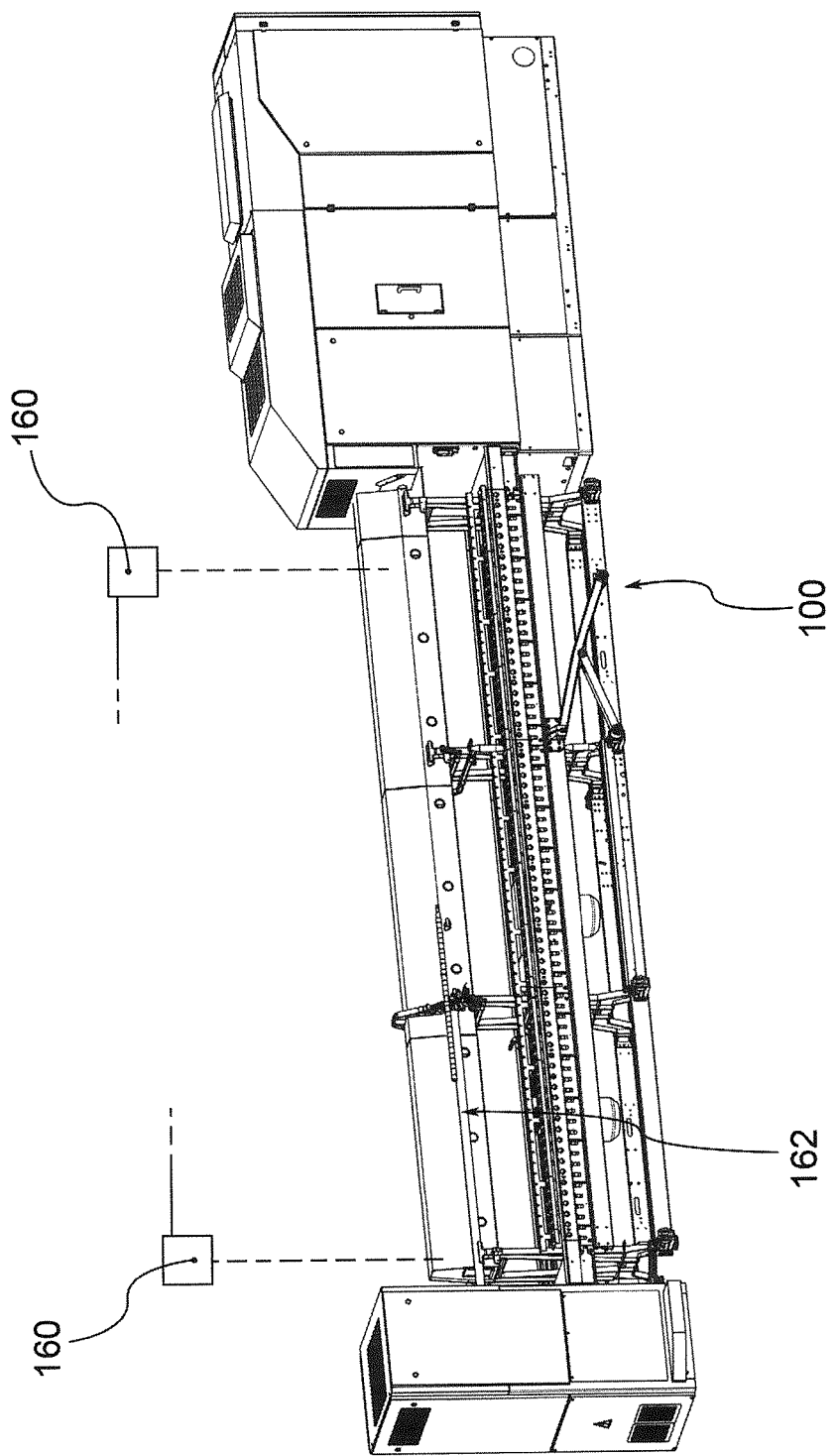
Figure 7:
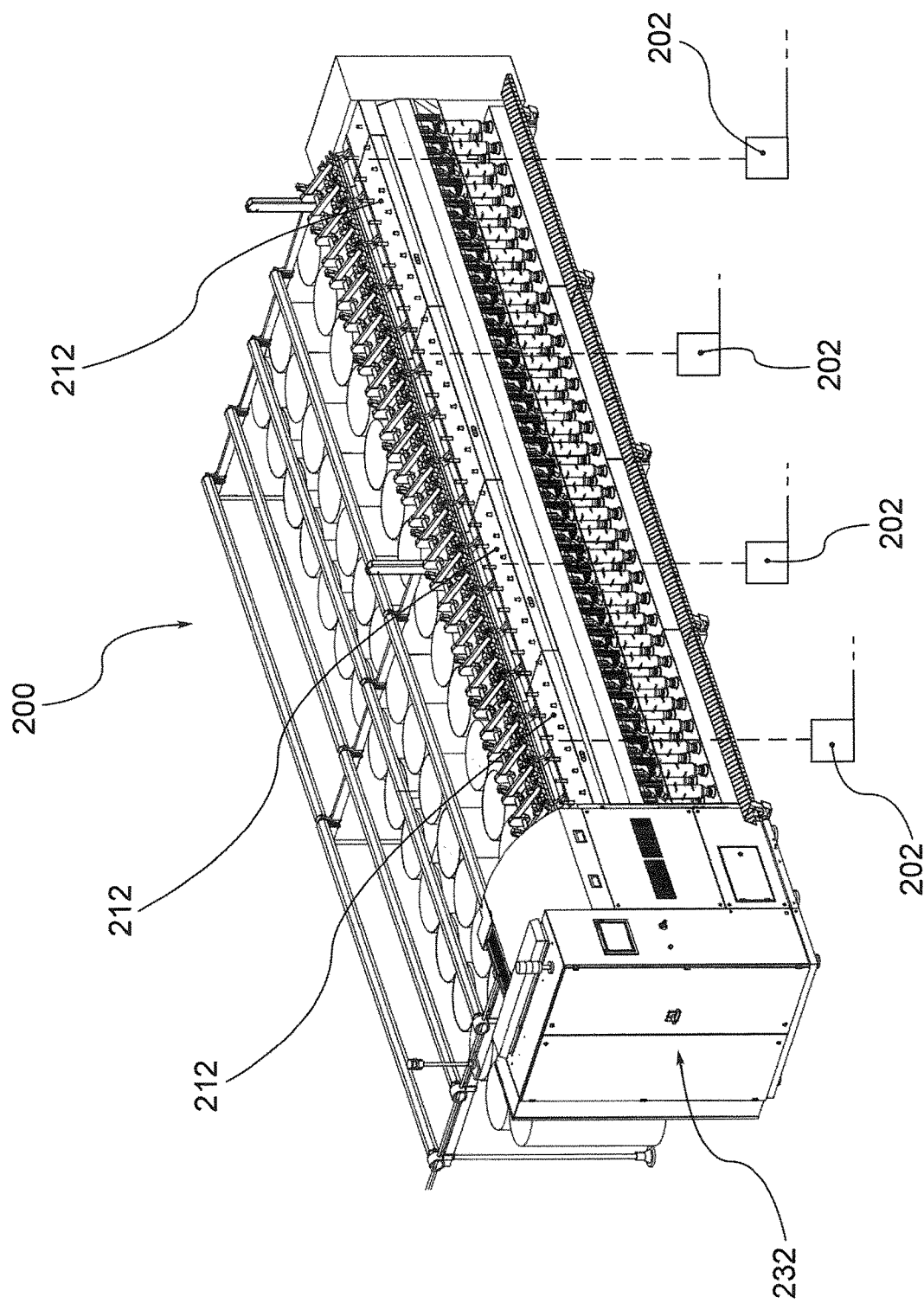
Figure 8:
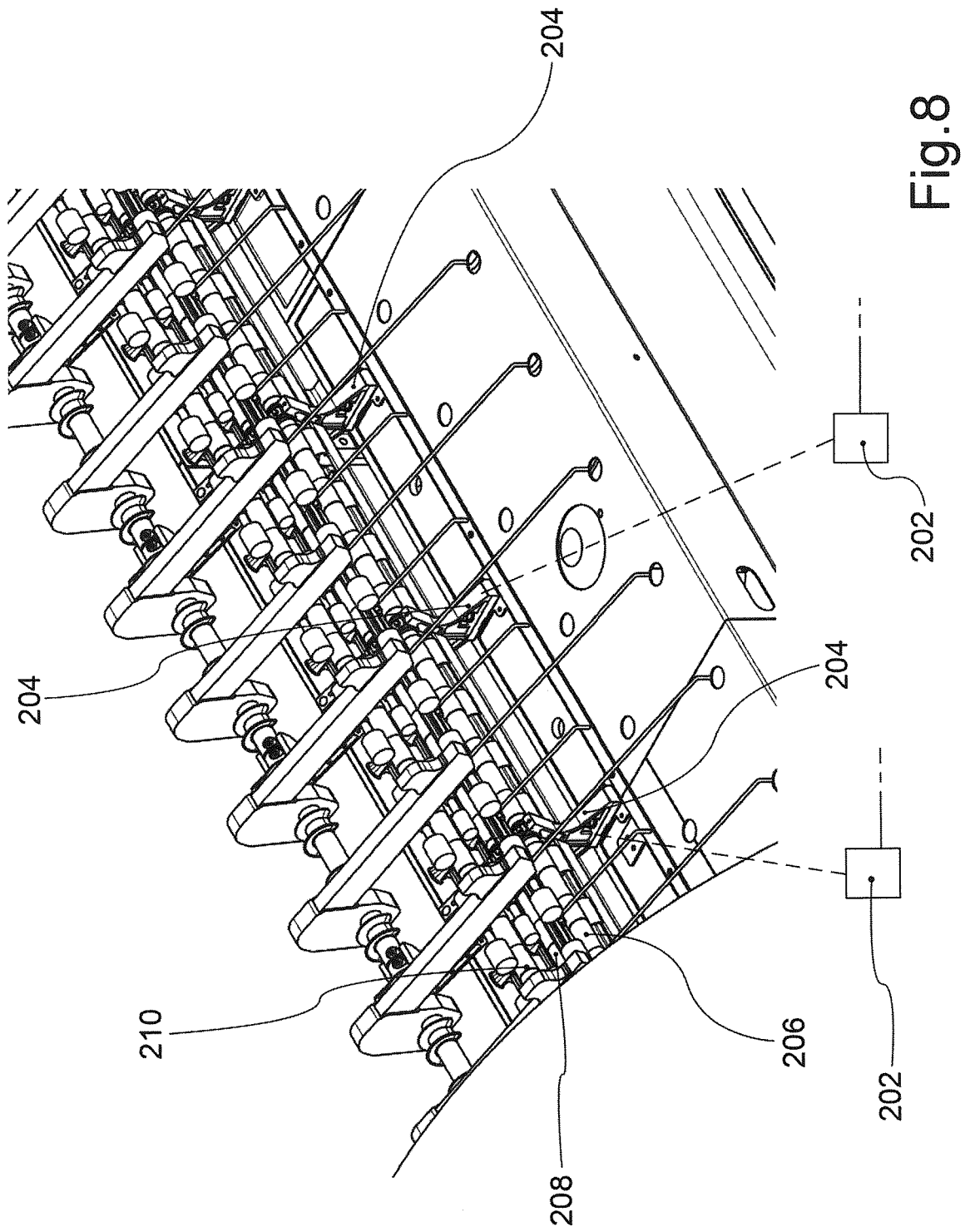
Figure 9:
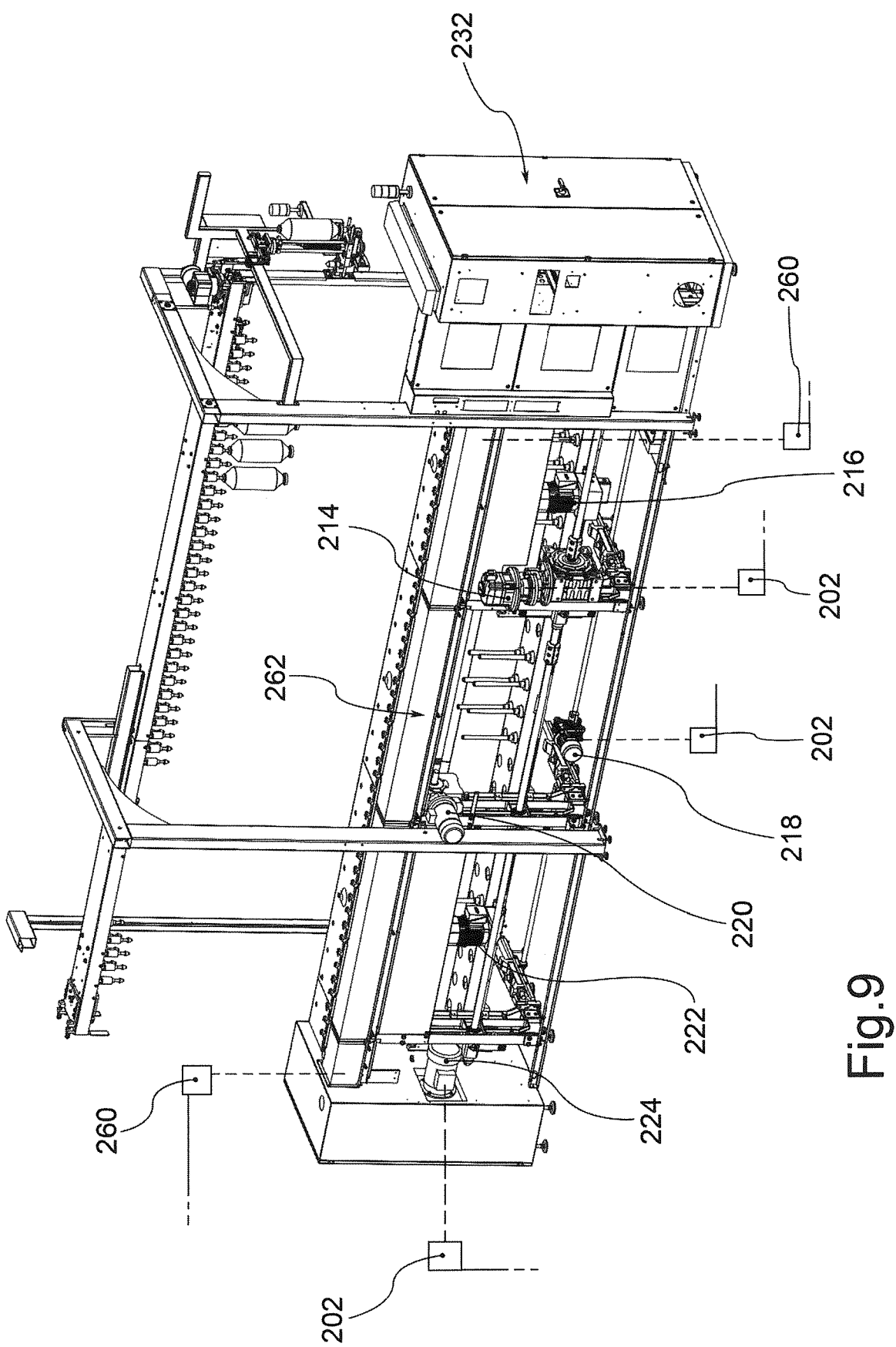
Figure 10:
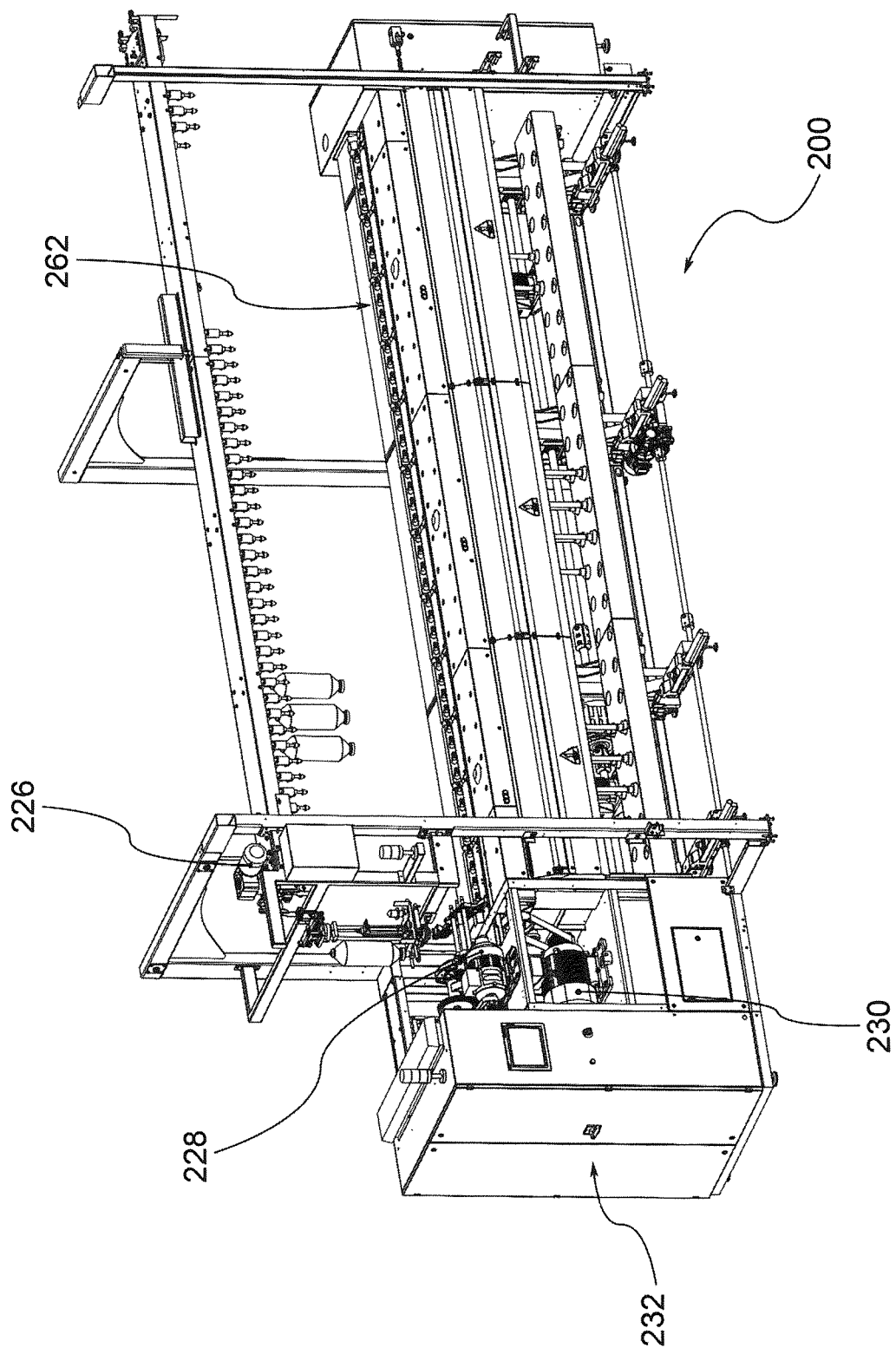
Figure 11:
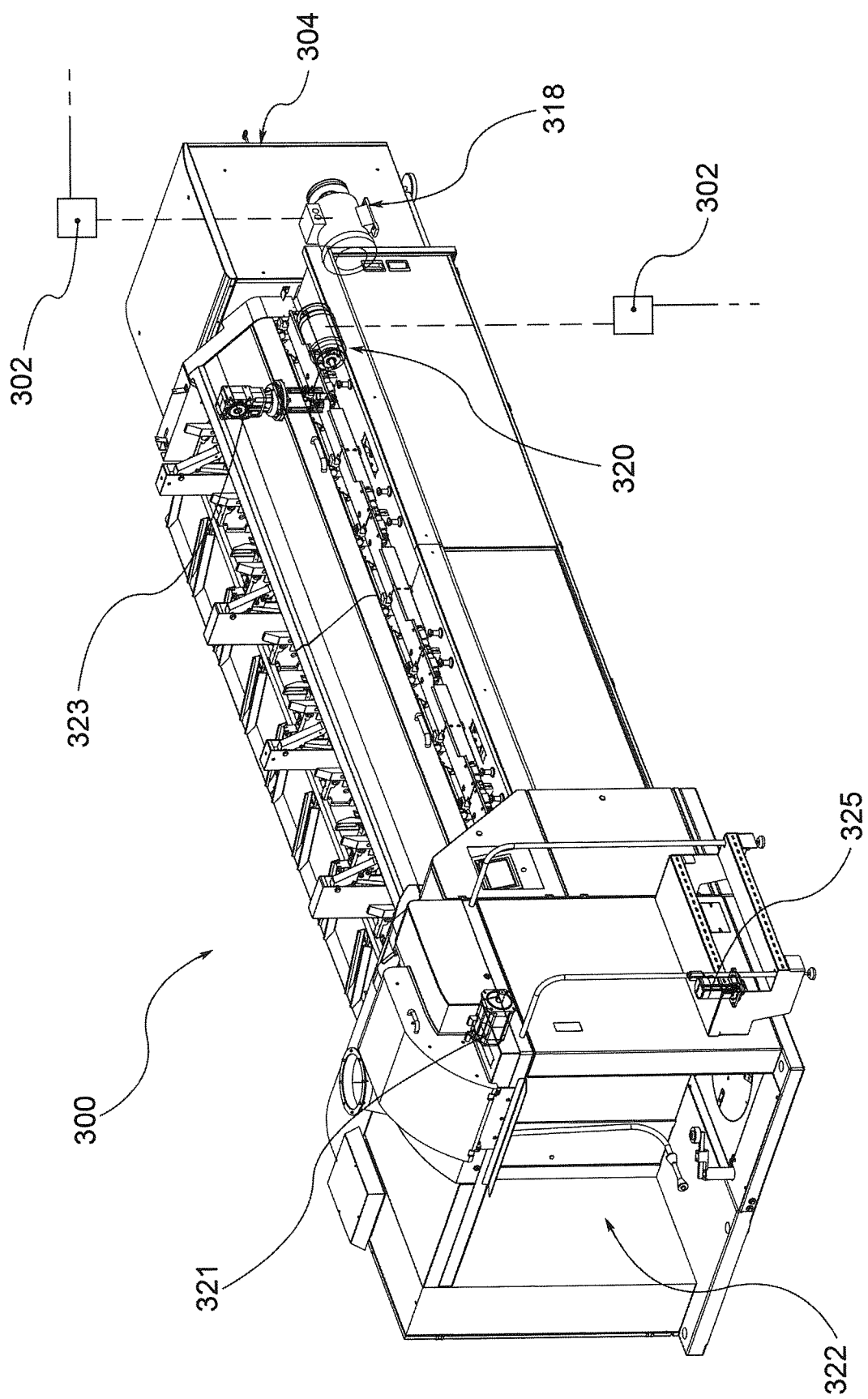
Figure 12:
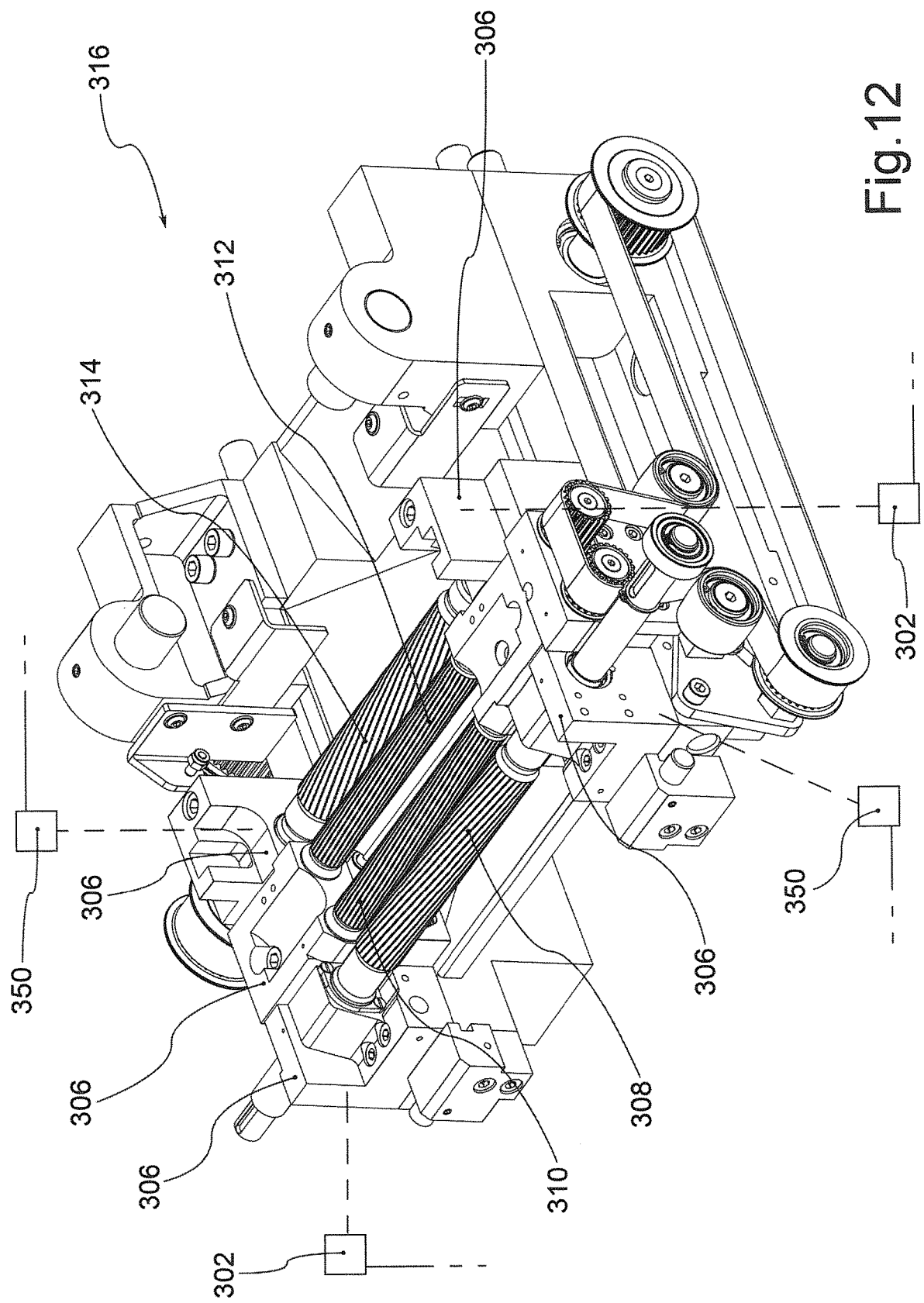
Figure 13:
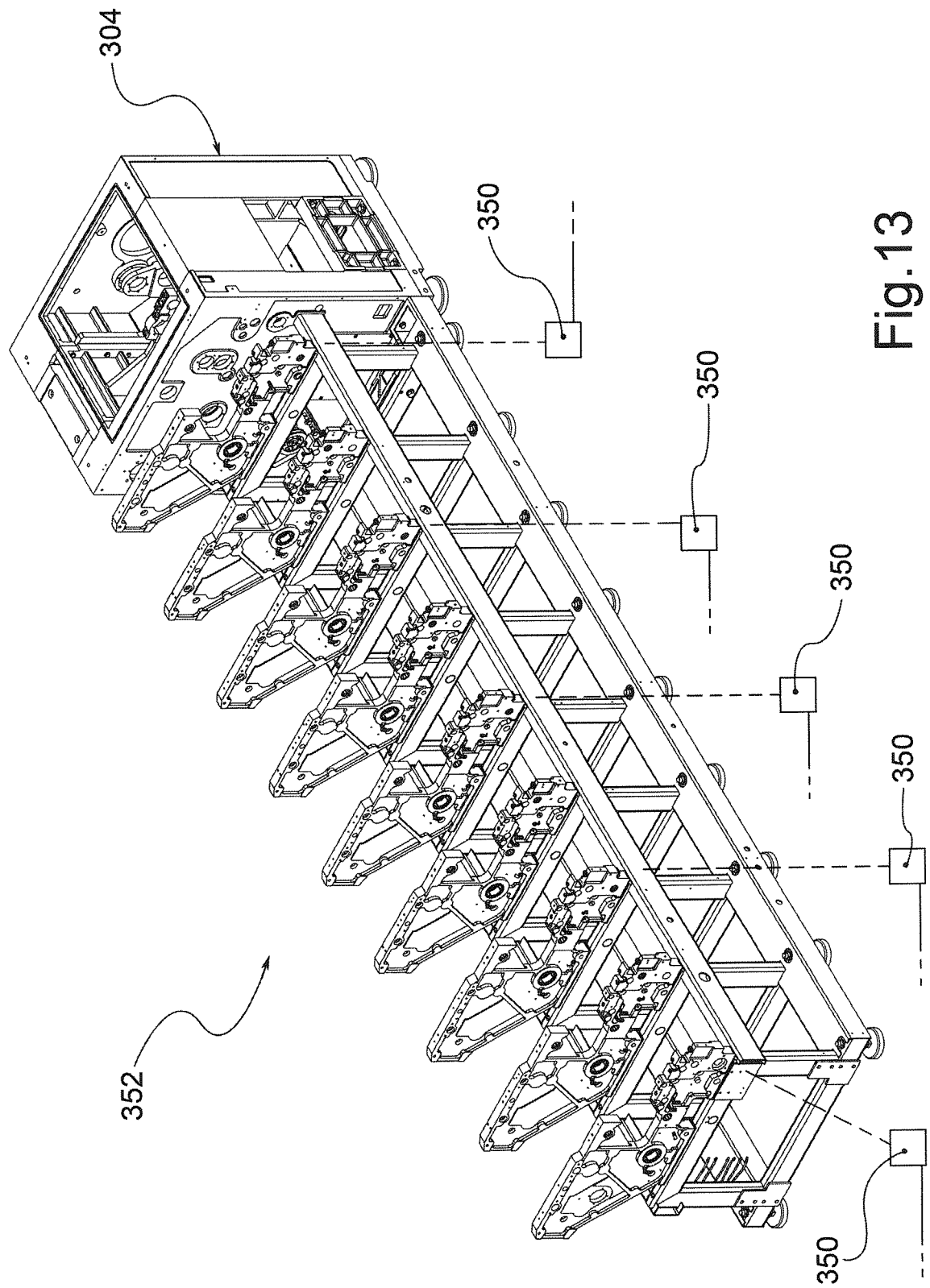
Figure 14:
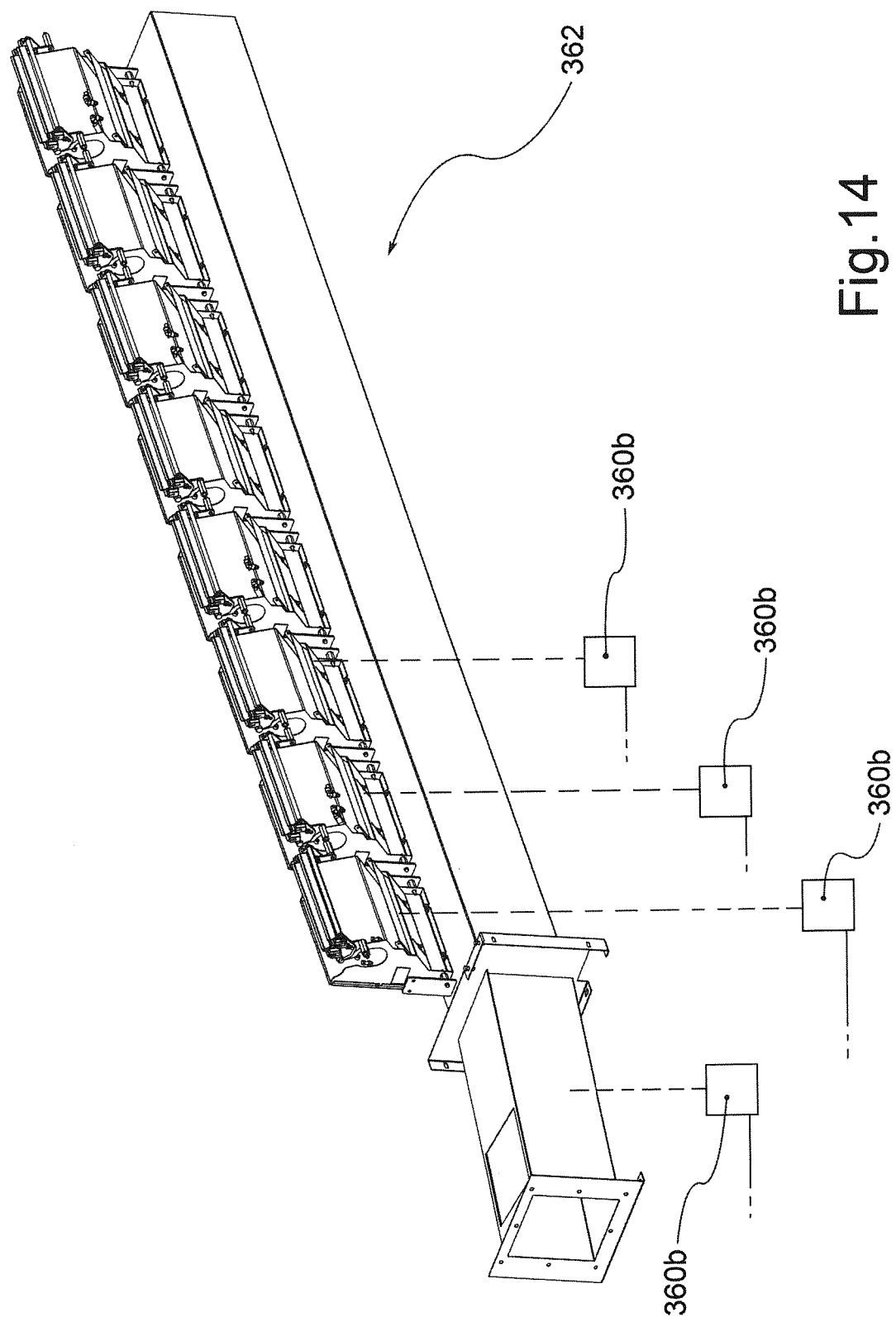

According to a preferred embodiment, in accordance with FIG. 2, the monitoring system also comprises local transmission/reception means 30, for example with wireless (Wi-Fi type) technology, installed at the spinning mill, operatively connected with the devices 20 (possibly grouped in groups 20' based on the type of machine to which they are connected), the control units of the machines and possibly with the image acquisition means.

Furthermore, the monitoring system includes storage means 40, for example a server, installed at the spinning mill, operatively connected to the local transmission/reception means 30, for global data storage (i.e., operating data and status data) coming from the devices 20, the control units and/or the image acquisition means.

Preferably, moreover, the local apparatus 10 comprises a local processing device 50, for example a PC, installed at the spinning mill, operatively connected to the storage means 40, for local processing of the global data stored.

Preferably, the transmission of global data from the sensors 20 and from the control units to the transmission/reception means 30 and from these to the storage means 40 and to the processing means 50 takes place separately from the main intranet of the spinning mill.

Preferably, a plurality of spinning lines 1 are provided with the local apparatus 10 described above for the collection and transmission of data.

Additionally, the monitoring system includes main storage means 60, placed in a remote control room with respect to the spinning line 1, and remote transmission/reception means 70, constituted for example by the Internet network, operatively connected to the local storage means 40 and/or the local processing means 50 of each spinning line 1, and to the main storage means 60, for the transmission and storage of the global data collected from the plurality of spinning lines 1.

Preferably, the global data collected locally is transmitted to the main storage means 60 remotely with temporal continuity ("real time" mode); according to further embodiments, this data is transmitted with a predefined frequency, such as daily or weekly ("batch" mode); according to a still further embodiment, this data is transmitted upon the occurrence of a predefined event, such as in case of a machine stoppage, upon the approach of scheduled service ("event based" mode).

Additionally, the monitoring system includes remote processing means 80, such as a PC, operatively connected to the Internet network and/or to the main storage means 60, for processing the global data from each spinning line.

A machine 2, 4, 6, 8 according to this invention comprises at least one device for detecting a physical quantity, such as an operating parameter, operatively connected to the local apparatus 10 described above.

Spinning Machine (FIGS. 3 to 6)

In a spinning machine 100 according to this invention, said detection device is a temperature sensor 102 positioned to detect the temperature of support structures of idle pulleys 104 that define the path of a belt for moving roving bobbins 106 of spindles 108 of the spinning machine 100, moved by motor groups 110. In particular, said temperature sensors are suitable for detecting the temperature of support structures of bearings of said idle pulleys 104.

For example, said temperature sensors 102 are associated to the support structures of the idle pulleys 104a that send back the belt 106 between one bank and the other of the spinning machine; in a further embodiment, said idle pulleys 104b send back the belt 106 between a motor group 110, comprising an electric motor 111a and a belt-tensioner wheel 111b, and the other in a same bank of the spinning machine 100, along a return section of the path (in which the belt does not engage the spindles); in a still further embodiment, said pulleys 104b send back the belt 106 between a motor group 110 and the other in a same bank of the spinning machine 100 along an active section of the path (in which the belt engages the spindles).

In a further embodiment, said temperature sensor is associated to one or more components housed in a control box 120 of the spinning machine, in which are contained the movement mechanisms of drawing cylinders 122, 124, 126 of the spinning machine 100, for example cylinder control gears and belts 128.

In a further embodiment, said temperature sensor is associated to the electric motor 111a of the motor group 110 of the spinning machine 100, for detecting the temperature of said motor.

According to a further embodiment, said detection device is a force sensor 130 to detect the tension of belts of the spinning machine, for example the spindle moving belt 106 or the cylinder drive belt 128.

According to a further embodiment, said detection device is a current sensor 140, suitable for detecting the current absorbed by each of the motors 111a of the motor groups 110.

According to a still further embodiment, said detection device is an acceleration sensor 150 associated to a support structure of the idle pulleys 104, 104a, 104b, 104c or to the support structure of the bearings of the drawing cylinders 122, 124, 126.

According to a yet further embodiment, said detection device is a pressure sensor 160 suitable for detecting the depression in the suction ducts of the spinning machine.

For example, said pressure sensor 160 is associated to a suction channel 162 that extends between longitudinal ends of the spinning machine 100, for example in a position that overlaps the roving frames.

Preferably, two pressure sensors 160 are provided, applied near the longitudinal ends of said suction channel 162.

Preferably, moreover, through an operational connection with the control unit of the spinning machine 100, in addition to the detected data and machine status data, the data transmitted to the main storage means 60 of the monitoring system includes data related to the occurrence of alarms due to the failure to advance of the plates that support the tubes and the bobbins of the spinning machine in the steps of doffing, the operation of loading/unloading the tubes/bobbins, the breakage of the roving during the processing step, the breakage of the drive belts of the spindles and drawing cylinders.

Roving Frame (FIGS. 7 to 10)

In a roving frame 200 according to this invention; said detection device is a temperature sensor 202 positioned to detect the temperature of support structures 204 of drawing cylinders 206, 208, 210 of the frame 200 or to detect the temperature inside of boxes 212 containing movement mechanisms for the fins of the frame.

According to a further example, said temperature sensor 202 is positioned to detect the temperature in the vicinity of the frame motors 200, for example of a motor 214 for driving the carriage, a motor 216 for driving the spools, a motor 218 for the translation of the carriage, a motor 220 to drive the bridge, a motor 222 for driving the spools, a motor 224 for controlling the suction, a motor 226 for driving the bridge tape, a motor 228 for driving the drafting rollers and a motor 230 for driving the fins.

According to a still further example, said temperature sensor 202 is positioned to detect the temperature inside of an electrical box 232 containing electronic devices for the management of the frame 200.

According to a yet further embodiment, said detection device is a pressure sensor 260 suitable for detecting the depression in the suction ducts of the frame.

For example, said pressure sensor 260 is associated to a suction channel 262 that extends between longitudinal ends of the frame 200, for example in a position that overlaps the boxes 212.

Preferably, two pressure sensors 260 are provided, applied near the longitudinal ends of said suction channel 262.

Preferably, moreover, through an operational connection with the control unit of the frame 200, in addition to the detected data and machine status data, the data transmitted to the main storage means 60 of the monitoring system includes data related to the occurrence of alarms due, for example, to the breakage of the roving during the processing step, to breakage of the belts of the feed creel, to operating anomalies of the heat exchanger of the tubes or spools and anomalies during the step of doffing of the tubes or spools.

Comber (FIGS. 11 to 14)

In a comber 300 according to this invention, said detection device is a temperature sensor 302 positioned inside a head box 304 to detect the temperature of the oil or to detect the temperature of support structures 306 of the bearings of the drawing cylinders 308, 310, 312, 314 of the drawing group 316 of the comber 300.

According to a further example, said temperature sensor 302 is positioned to detect the temperature of motors of the machine, for example of a motor 318 for moving the axes of the machine or of a motor 320, for driving the brushes destined for the cleaning of the circular combs or a motor 321 for driving the cylinders of the drawing group or a motor 323 for driving the unwinder rollers or a motor 325 for driving the spin pot device.

According to a still further example, said temperature sensor 302 is positioned to detect the temperature inside of an electrical box 322 containing electronic devices for the management of the comber 300.

According to a still further embodiment, said detection device is an acceleration sensor 350 associated to a support frame 352 of the comber or the support structures 306 of the bearing's of the drawing cylinders 308, 310, 312, 314.

According to a still further embodiment, said detection device is a pressure sensor 360 associated to a suction channel 362 that extends along the combing heads of the comber, for example, downstream of all the combing heads, taking into account the direction of suction of the air, and/or several pressure sensors 360b respectively associated to each combing head for detecting the depression on each of them.

Preferably, moreover, through an operational connection with the control unit of the comber 300, in addition to the detected data and the machine status data, data is transmitted to the main storage means 60 of the monitoring system related to the onset of alarms, for example due to malfunctions of the device for the replacement of pots full of material with those to be filled, the signalling of fibre windings astride the cylinders of the drawing group, the signalling of the accumulation of material in the veil conveyor of fibres at the turn of the cylinders of the drafting unit, the signalling of accumulation of material in the doffing conveyor of fibre at the exit of the drawing group, the signalling of anomalies of the feed of material to the individual combing heads, malfunctions of the coiler, i.e., the device destined to the positioning of the belt of combed/worked fibre inside the pots, as well as data related to the number of alarms detected.

Lap Winder (FIGS. 15 to 17)

In a lap winder 400 according to this invention, said detection device is a temperature sensor 402 positioned to detect the temperature of support structures 404 of drawing cylinders 406, 408, 410 of the lap winder 400 or the cylinders of the training device of the lap.

According to a further example, said temperature sensor 402 is positioned to detect the temperature of the motors of the lap winder, for example, a motor 412 for driving the drawing groups or a motor 414 for driving the lap training calenders.

According to a still further example, said temperature sensor 402 is positioned to detect the temperature inside of an electrical box 416 containing electronic devices for the management of the lap winder 400.

According to a further embodiment, said detection device is an acceleration sensor 402 associated to the support structures 404 of the drawing cylinders 406, 408, 410 of the lap winder 400 or the cylinders of the lap training device.

Preferably, moreover, through an operational connection with the control unit of the lap winder 400, in addition to the detected data and machine status data, the data transmitted to the main storage means 60 of the monitoring system includes data related to the occurrence of alarms due, for example, to the breakage of belts coming from the feed creel, to the signalling of the winding of the fibres astride the cylinders of the drawing groups, to anomalies in the formation zone of the lap, anomalies in the step of loading empty tubes ready to be placed in the lap training zone and anomalies in the operation of the tipper of the complete canvases.

Drawing Frame (FIGS. 18 to 21)

In a drawing frame 500 according to this invention, said detection device is a temperature sensor 502 positioned to detect the temperature of support structures 504 of drawing cylinders 506, 508, 510 of a drawing group 512 or the drawing frame 500.

According to a further example, said temperature sensor 502 is positioned to detect the temperature of motors of the drawing frame, for example of a motor 514 for the rotation of the pot or a motor 516 for the replacement of the pot or a motor 518 for the movement of the cylinders of the drawing self-regulation device or a motor 520 for the moving of the cylinders of the drawing group.

According to a further example, said temperature sensor 502 is positioned to detect the temperature inside of an electrical box 522 containing electronic devices for the management of the drawing frame 500.

According to a further embodiment, said detection device is an acceleration sensor 550 associated to the support structures 504 of the drawing cylinders 506, 508, 510.

According to a still further embodiment, said detection device is a pressure sensor 560 associated to a suction channel 562 that extends through the machine for the extraction of material from the entry zone, the drawing group and/or from the exit zone.

Preferably, moreover, through an operational connection with the control unit of the drawing frame 300, in addition to the detected data and the machine status data, data is transmitted to the main storage means 60 of the monitoring system related to the onset of alarms, for example due to malfunctions of the device for the replacement of full pots with those to be filled, the signalling of fibre windings astride the cylinders of the drawing group, the breakage of belts coming from the feed creel and anomalies due to accumulation of material in the conveying zone to the drawing group of the exit belt.

Carding Machine (FIGS. 22 to 28)

A carding machine 600 according to this invention comprises a carding drum 620;

a silo 610 upstream of said carding drum 620, suitable for feeding fibre flakes to said drum, and a collection device 630 downstream of the drum 620, suitable to receive a carded tape from said drum and wind it in a spin pot 640.

According to an embodiment, said detection device is a temperature sensor 602 positioned to detect the temperature of a support arch 604 on which the end supports of the mobile flats 606 slide.

According to a still further example, said temperature sensor 602 is positioned to detect the temperature inside Of an electrical box 608 containing electronic devices for the management of the carding machine.

According to a still further example, said temperature sensor 602 is positioned to detect the temperature of the motors of the machine, for example a motor 642 for rotating the pot 640 of the collection device 630, a motor 644 for moving a doffer engaged with the drum 620 to unload the material from said drum and/or the. cylinders of the doffing group, a motor 646 for moving a licker-in engaged with the drum 620 to load the material to the drum, a motor 648 for moving cylinders of the silo for feeding the fibre in flakes to the licker-in, motors 650, 652 for the movement of cylinders of the silo for the forced entry of the fibre to the silo and for the disintegration of the fibre.

According to a still further example, said temperature sensor 602 is positioned to detect the temperature of a motor 654 for driving a fan of the silo 610, a motor 656 for the actuation of a cleaning group for the mobile flats, a motor 658 for rotating the drum 620, a motor 660 for rotating the brush of the doffing group and a motor 662 for moving the exit group towards the collection device 630.

In accordance with a further embodiment, said detection device is a distance sensor 662 positioned to detect the distance between the support arch 604 of the mobile flats 606 and a fixed abutment 605 of the machine, to monitor the registration of said mobile flats.

According to a still further embodiment, said detection device is a pressure sensor 664 associated to a suction channel 662 that extends through the machine for the extraction of the material; in particular, the suction channel 662 has a mouth 663 for the suction from the area immediately upstream of the licker-in, a mouth 665 for the suction from the area immediately downstream of the licker-in, a mouth 667 for the suction from the under-drum area, a mouth 669 for extraction from the post-carding zone, mouths 671, 673 for extraction from the area of the doffing brush, a mouth 675 for extraction from the area of the calender group, a mouth 677 for the suction from the area of the mobile flat device and a mouth 679 for extraction from the pre-carding area.

Preferably, moreover, through an operational connection with the control unit of the carding machine, in addition to the detected data and the machine status data, data is transmitted to the main storage means of the monitoring system related to the onset of alarms, for example due to malfunctions due to clogging of material in the vicinity of cylinders destined for carding the fibres (for example silo feed cylinder, carding feed cylinder, drum, doffer, doffing cylinder, cowl board, and a coiler calender), alarms on said cylinders, breakdown alarm of the carded/worked belt exiting the machine and before the deposit in the collection vessel and the absence of feeding of material entering the pre-carding area of the machine.

Opener (FIG. 29)

In an opener 700 according to this invention, said detection device is a temperature sensor 702 positioned to detect the temperature of support structures 704 of bearings of rotating cylinders of the opener, for example an opening cylinder 706, of the opener 700.

Preferably, moreover, through an operational connection with the control unit of the opener, in addition to the detected data and the machines status data, data is transmitted to the main storage means 60 of the monitoring system related to the occurrence of alarms.

Plucker (FIGS. 30 and 31)

In a plucker 800 according to this invention, said detection device is an acceleration sensor 850 associated with a carriage 810 of the plucker 800, for example in correspondence of the free end of this, and/or a support column 820 of said carriage 810, for example in correspondence of the sliding guides 822, 824 of said carriage.

According to a still further embodiment, said detection device is a pressure sensor 830 associated to a suction channel 832 that extends through the machine and, in particular, through the column 820 and the carriage 810 for the extraction of the material to be plucked.

Preferably, moreover, through an operational connection with the control unit of the plucker, in addition to the detected data and the machines status data, data is transmitted to the main storage means 60 of the monitoring system related to the occurrence of alarms.

Innovatively, the monitoring system according to this invention allows effectively implementing a predictive maintenance and, through special calculation algorithms, allows notifying the maintenance operators of the need to perform preventive maintenance service, since it allows collecting, storing and analysing a huge amount of data (Big Data, i.e., a collection of data so extensive in terms of volume, speed and variety as to require specific technologies and analytical methods for the extraction of value), coming from a large number of machines of a spinning line or multiple spinning lines.

Advantageously, moreover, the system according to the invention allows collecting and storing a large amount of data over very long periods of time, thereby allowing the detection of drift phenomena, or statistical phenomena, that are often symptoms of malfunctions or the slow deterioration of operating conditions, usually not recognizable or identifiable.

According to a further advantageous aspect, there is the possibility of collecting and storing various parameters of a machine, identifying correlations between them, for example between speed, current absorption and temperature. In addition, the system allows analysing the data collected in the domain of frequencies for identifying periodic phenomena on a single parameter or a result of these correlations.

According to a still further advantageous aspect, the system allows identifying correlations between the performance of one or more parameters of a machine with those of a further machine, downstream or upstream of the preceding one, for example the trend of parameters of a carding machine or a blow room machine (upstream machine) with that of a spinning machine (downstream machine).

For example, as shown in FIGS. 32 and 33, it is possible to identify the trend of generic parameters P1 and P2 as a function of a further generic parameter X and correlate them with a correlation function $\phi\{P1(X),P2(X)\}$ or the trend of a generic parameter P1 as a function of time t.

The architecture thus identified, given its flexibility, the possibility of accumulating large amounts of information and data (Big Data), and the ability to develop processing and calculation functions in a single central system that has available the historical trends of the operating parameters of the machinery, allows the gradual and continuous identification, development and evolution of correlation functionalities and prediction algorithms.

Purely by way of example, it is possible to correlate the trend of the quality of the carded tape in several carding machines as a function of the speed (for example, peripheral) of the drum or as a function of the ambient temperature over a calendar year.

Moreover, advantageously, the monitoring system according to this invention allows activating an online support service by virtue of the remote detection of an anomalous trend, drift, a value or any other anomaly.

According to a further advantageous aspect, the monitoring system according to this invention allows to remotely updating the management software of the machines, without the need for local intervention.

It is clear that one skilled in the art, in order to meet specific needs, may make changes to the monitoring system described above, all contained within the scope of protection defined by the following claims.

The invention claimed is:

1. A method for identifying malfunctions or degradation of the operation of a textile machine, comprising the steps of:
providing, in a spinning line, a plurality of textile machines, each textile machine provided with a control unit for processing management and at least one detection device for detecting a physical value of a component of a respective textile machine constituting detected data, wherein the detected data for each textile machine includes at least one of:
i) a temperature value of support structures of moving organs of the machine;
ii) a pressure value in suction ducts of the machine;
iii) an acceleration value of the component;
iv) a distance value between two organs of the machine;
v) a current value of electric motors of the machine;
vi) a force value of tensioned belts of the machine; and
vii) images relating to the machine or organs thereof;
storing, by a storage device remotely located with respect to the spinning line, the detected data or status data of the spinning line or of the textile machine;
transmitting the detected data or the status data from the detection device to the storage device;
providing remote processing means operatively connected with the storage device for processing the detected data or the status data stored;
correlating a trend of the detected data or the status data of the individual ones of the textile machines based on an amount of data; and
implementing a predictive maintenance on at least one of the textile machines based on the trend.

2. The method according to claim 1, further comprising correlating the trend of the detected data or the status data of a first textile machine of the plurality of textile machines with the trend of detected data or status data of a second textile machine of the plurality of textile machines.

3. The method according to claim 1, wherein the detected data or the status data are transmitted to the storage device in real time means with temporal continuity.

4. The method according to claim 2, wherein the detected data or status data are transmitted to the storage device with a predefined frequency or upon an occurrence of a predefined event.

5. The method according to claim 2, wherein the physical value of the component of the textile machine is an operating parameter.

6. The method according to claim 5, further comprising:
analysing collected data of a single operating parameter, the collected data being the detected or the status data collected over a period of time, and
detecting a drift phenomenon indicating a deterioration of operating conditions.

7. The method according to claim 2, wherein the first textile machine is upstream of the second textile machine in the spinning line.

8. The method according to claim 7, wherein the first textile machine is a blow room machine and the second textile machine is a spinning machine.

9. The method according to claim 1, wherein the detected data or the status data are transmitted to the storage device in real time with temporal continuity.

10. The method according to claim 1, wherein the detected data or the status data are transmitted to the storage device with a predefined frequency or upon an occurrence of a predefined event.

11. The method according to claim 1, wherein the detected data or the status data are transmitted to the storage device with a predefined frequency, the predefined frequency being daily or weekly.

12. The method according to claim 1, wherein the detected data or the status data are transmitted to the storage device upon an occurrence of a predefined event, the predefined event being a machine stoppage or an approach of scheduled service.

13. The method according to claim 1, wherein the plurality of textile machines of the spinning line comprise:
one or more blow room machines, a blow room machine being at least one of: a plucker, a mixer, an opener, a mixing loader, a scale loader, and a tuft blender;
one or more carding machines;
one or more combing machines, a combing machine being at least one of: a drawing frame, a lap winder, and a comber; and
one or more spinning machines, a spinning machine being a roving frame or a spinning machine.

14. The method according to claim 1, further comprising:
identifying an anomalous trend of the detected data or the status data of an individual textile machine of the plurality of textile machines.

15. The method according to claim 1, further comprising:
notifying an operator to perform a maintenance on at least one textile machine of the plurality of textile machines in the spinning line.

16. The method according to claim 1, wherein the amount of data is collected over a period of time.

17. A method of identifying a malfunction or a degradation in an operation of a textile machine, comprising:
providing a textile machine in a spinning line, wherein the textile machine comprises (i) a control unit for processing management data and (ii) at least one detection device for detecting a physical value of a component of the textile machine constituting detected data, wherein the at least one detection device is configured to provide at least one of:
a temperature value of support structures of moving organs of the textile machine;
a pressure value in suction ducts of the textile machine;
an acceleration value of the component of the textile machine;
a distance value between two organs of the textile machine;
a current value of electric motors of the textile machine;
a force value of tensioned belts of the textile machine; and
images relating to the textile machine or organs thereof;
providing a local monitoring system operatively connected to the at least one detection device, the local monitoring system comprising:
local transmission/reception means;
a local data storage; and
a local processing device;
providing main storage means remote with respect to the spinning line for storing detected data or status data of the spinning line or of the textile machine;
providing remote transmission/reception means for transmitting the detected data or the status data collected in the local storage to the main storage means;
providing remote processing means operatively connected with the main storage means for processing the detected data or the status data as stored; and
correlating a trend between the detected data or the status data of the textile machine and;
implementing a predictive maintenance based at least in part on an amount of data.

* * * * *